United States Patent
Hogan

(10) Patent No.: US 6,899,750 B2
(45) Date of Patent: May 31, 2005

(54) METHOD AND APPARATUS FOR CLEANING A GAS

(75) Inventor: Jim S. Hogan, Sugar Land, TX (US)

(73) Assignee: J. S. Hogan, Sugar Land, TX (US)

(*) Notice: Subject to any disclaimer, the term of this patent is extended or adjusted under 35 U.S.C. 154(b) by 77 days.

(21) Appl. No.: 10/601,930

(22) Filed: Jun. 23, 2003

(65) Prior Publication Data

US 2005/0061153 A1 Mar. 24, 2005

Related U.S. Application Data

(63) Continuation-in-part of application No. 10/229,853, filed on Aug. 6, 2002, now Pat. No. 6,764,531, which is a continuation-in-part of application No. 10/085,830, filed on Feb. 28, 2002, now Pat. No. 6,485,548, which is a continuation-in-part of application No. 09/900,828, filed on Jul. 6, 2001, now Pat. No. 6,391,100.

(51) Int. Cl.[7] .............................................. B01D 47/02
(52) U.S. Cl. .............................. 96/240; 96/242; 96/269; 96/282; 96/284; 96/322
(58) Field of Search ........................ 95/216, 218, 221, 95/222; 96/267, 268, 269, 278, 281, 282, 284, 240, 242, 322

(56) References Cited

U.S. PATENT DOCUMENTS

| | | | | |
|---|---|---|---|---|
| 2,200,891 A | * | 5/1940 | Nyborg ........................ 96/275 |
| 2,395,526 A | * | 2/1946 | Woodward et al. .......... 546/146 |
| 2,941,872 A | * | 6/1960 | Wilhelm et al. ............. 422/259 |
| 3,005,515 A | * | 10/1961 | Caddell ........................ 96/282 |
| 3,149,935 A | * | 9/1964 | Jamison et al. ............... 95/218 |
| 3,321,191 A | * | 5/1967 | Najarian ....................... 261/29 |
| 3,379,422 A | * | 4/1968 | Liesenhoff .................... 261/84 |
| 3,385,030 A | * | 5/1968 | Letvin .......................... 95/216 |
| 3,448,562 A | * | 6/1969 | Wisting ........................ 95/210 |
| 3,517,485 A | * | 6/1970 | Dell'Agnese et al. ......... 96/261 |
| 3,524,631 A | * | 8/1970 | Mare ........................ 261/112.1 |
| 3,538,684 A | * | 11/1970 | Esterhoy, Jr. et al. ......... 95/210 |
| 3,581,467 A | * | 6/1971 | Donnelly ...................... 95/198 |
| 3,789,585 A | * | 2/1974 | Arnold et al. ................. 96/237 |
| 3,936,283 A | * | 2/1976 | Solis ............................. 96/222 |
| 4,478,616 A | * | 10/1984 | Jarvenpaa ..................... 96/268 |
| 4,514,194 A | * | 4/1985 | Jarvenpaa ..................... 95/218 |
| 4,529,421 A | * | 7/1985 | Parma .......................... 96/239 |
| 4,594,081 A | * | 6/1986 | Kroll et al. ................... 96/235 |
| 4,762,538 A | * | 8/1988 | Michler et al. ............... 95/205 |
| 4,874,400 A | * | 10/1989 | Jury ............................. 95/38 |
| 5,076,819 A | * | 12/1991 | Sharrow ....................... 95/151 |
| 5,277,707 A | * | 1/1994 | Munk et al. .................... 95/8 |
| 6,042,636 A | * | 3/2000 | Aishima et al. ............... 95/92 |
| 6,391,100 B1 | | 5/2002 | Hogan | |
| 6,485,548 B1 | | 11/2002 | Hogan | |

* cited by examiner

Primary Examiner—Frank M. Lawrence
(74) Attorney, Agent, or Firm—Bracewell & Patterson, L.L.P.

(57) ABSTRACT

A system and method of cleaning a gas of undesired particulate, aromas, and gases is disclosed. The invention uses a centrifugal scrubbing space to liquid wet a gas and includes a container for containing a liquid with a pump to circulate the liquid. The gas is pumped from outside the container, through an inlet cylinder, a fan wheel, a scrubbing space, over a surface of the liquid, through a cyclone space, and out a top outlet. The liquid may be pumped with a standard pump, a cone-shaped rotatable case attached to the fan wheel, or a pump with a non-case rotatable case and an impeller attached to a same shaft as the fan wheel. The gas inlet may be positioned below or above the apparatus, and the fan motor may be positioned inside or outside the apparatus.

55 Claims, 17 Drawing Sheets

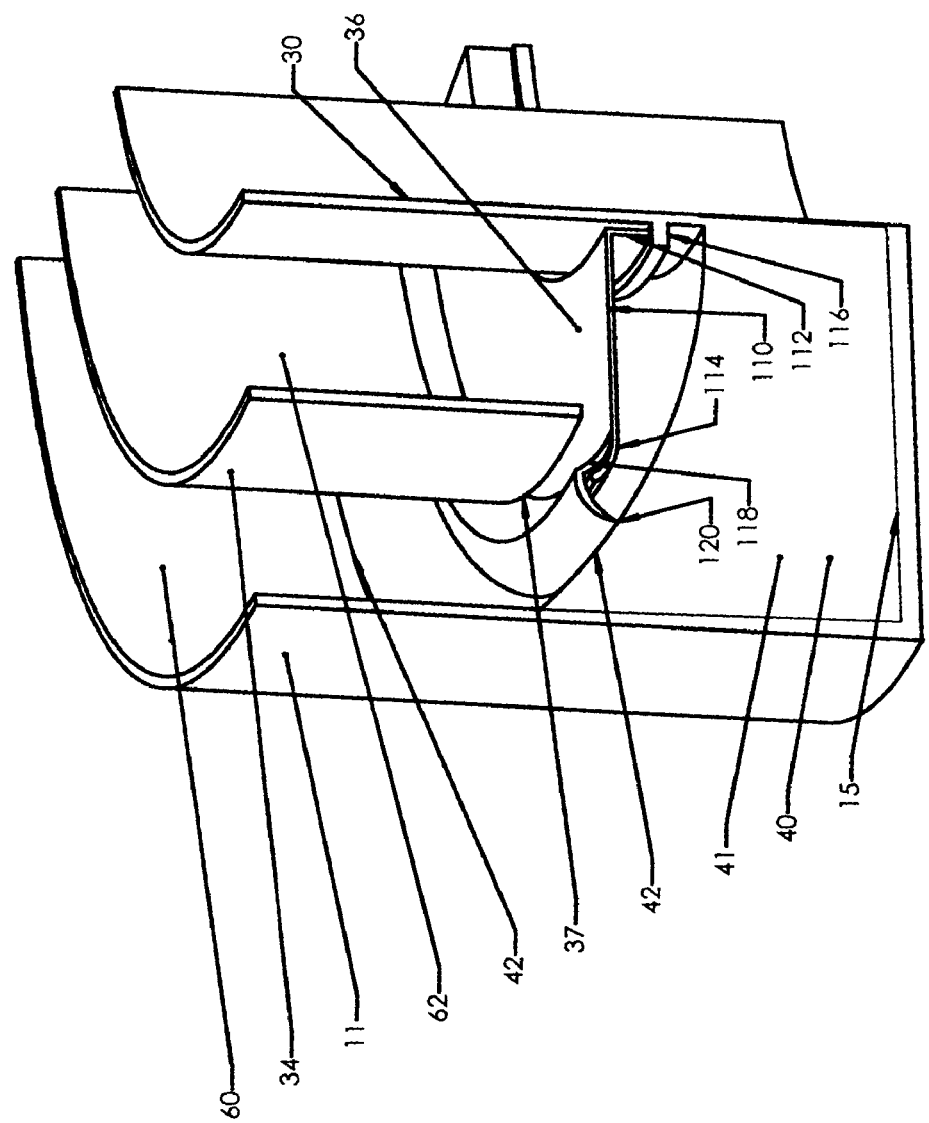
FIGURE 17

METHOD AND APPARATUS FOR CLEANING A GAS

RELATED APPLICATIONS

This application is a continuation-in-part of and claims benefit of priority of U.S. patent applications Ser. No. 10/229,853, filed 6 Aug. 2002, now U.S. Pat. No. 6,764,531, entitled *Method and Apparatus for Cleaning Gas*, which is a continuation-in-part of Ser. No. 10/085,830, filed 28 Feb. 2002, now U.S. Pat. No. 6,485,548, entitled *Method and Apparatus for Cleaning Gas*, which is a continuation-in-part of Ser. No. 09/900,828, filed 6 Jul. 2001, now U.S. Pat. No. 6,391,100, entitled *Method and Apparatus for Cleaning Gas*, all incorporated by reference herein.

TECHNICAL FIELD

The present invention relates generally to the field of cleaning a gas and more particularly to a method and apparatus for removing particulate and absorbing selected gases from a gas stream by mixing a gas with a liquid to wet the particulates and absorb the selected gases to discharge a cleaned gas in an economical manner.

BACKGROUND INFORMATION

It is very often desirable to clean a gas stream of particulates and/or undesirable gases. It is sometimes desirable to remove particulates or selective gases for capture or disposal from a gas stream by absorption or mixing with a liquid. It is also becoming more desirable and popular to clean air in domestic settings, particularly the removal of spores, bacteria, and viruses due to the current biological threats by terrorists. Other domestic pollutants include, but are not limited to, allergens such as pollen, mites, pet dandruff, hair and dead skin and dust, and gases such as carbon dioxide, carbon monoxide, and other auto emissions.

Several methods are currently used to clean or partially clean gases such as air in a domestic setting. Some of the most common methods of "cleaning air" are the utilization of filter systems, electrostatic devices, and venturi scrubbers. Filter systems require frequent cleaning and electrostatic devices and venturi scrubbers are limited in the quantity of gas that can be processed economically.

Viruses, bacteria, spores, small particulate and some small insects such as some small baby spiders, often float in air currents and even circle the earth. It is the that such minute living beings can travel to outer space and live for over one thousand years, even though exposed to extreme temperatures and radiation. It is therefore not reasonable to assume that the gravitational force of only one gravity can totally and efficiently remove such minute beings and particulate from the domestic air that we breathe, in a reasonable time period. Yet, it is very easy to provide a centrifugal force in excess of well over a thousand gravities with air at the surface of a flowing liquid, and to impact the surface of such flowing liquid with the air at a velocity in excess of 100 feet per second to remove the undesirable parts from the air.

It is a desire to provide an improved method and apparatus for removing particulates and selected gases from a gas stream by flowing the stream at a high velocity and subjecting it to a high centrifugal force at the surface of a flowing liquid. It is a further desire to convey a stream of gas through a stream of liquid at a high velocity to mix the air and liquid and to remove the undesirable parts from the air by absorption with the liquid. It is a still further desire to centrifugally remove retained liquids, wetted particulates, and heavier parts from the air stream by flowing the air stream at a high velocity through a cyclone.

SUMMARY OF THE INVENTION

Several embodiments of a system and method of cleansing a gas of undesired particulate, aromas, and gases of the type utilizing a liquid to wet the particulate and absorb selected gases from a gas stream are provided. A stationary cylinder, mounted in a vertical position, is provided to allow a liquid stream to flow centrifugally down and around the inside wall of the cylinder with a high velocity stream of gas to impact and centrifugally force the heavier particles to separate from the gas and mix with the liquid. The gas scrubber of the present invention includes a circular container, having a top circular outlet opening and a side wall with a bottom wall for providing a liquid reservoir therein having a surface positioned above the bottom wall that provides a space between the surface and the top opening.

The bottom wall is positioned above the floor level, to provide a passage way between the bottom wall and the floor, and is provided with a centrally positioned opening, connected to a first vertically mounted circular conduit that extends through the liquid reservoir and above the surface, to allow the flow of gas from below the bottom wall and through the conduit to above the liquid surface. A fan is positioned at the outlet of the conduit to draw the gas through the conduit and to accelerate the gas at a high velocity off the blades of the fan wheel. A second circular conduit, provided with a top wall, is positioned around the outside of the first conduit and the fan that provides a circular passage way between the outside wall of the first conduit and the inside wall of the second conduit. The second conduit is provided with an outlet opening positioned above the liquid surface to allow the discharge of the fan to flow at a high velocity around the circular passage way and out the outlet opening above the liquid surface. A pump is provided having an inlet, connected to the liquid reservoir, and an outlet, connected to the inside top wall of the second conduit, to flow a stream of the liquid to the inside wall of the second conduit. The gravity on the liquid and the friction between the liquid and the high velocity gas causes the gas and liquid to flow tangentially out to the second conduit outlet. Since the liquid is propelled horizontally out of the conduit outlet, caused by centrifugal force, the gas flows up and through the liquid stream and further mixes with the liquid. The gas then flows, in a circular manner, around the inside of the side wall, as in a cyclone, and out the side wall outlet opening.

In operation, gas is drawn up through an inlet cylinder by a rotating fan wheel and tangentially departs the fan wheel into a second cylinder, encircling the inlet cylinder, and then flows down the second cylinder and out the bottom opening of the second cylinder which is located above the surface of a liquid reservoir being held by an outside cylinder encircling the second cylinder. The gas then flows upward through the outside cylinder, in a circular manner, and out the top outlet of the outside cylinder. Liquid is pumped from the reservoir up to the top inside wall of the second cylinder and flows down the inside of the second cylinder with the gas. Particulates and heavier material are separated from the gas 1) when it impacts the wetted inside wall of the second cylinder at a high velocity, 2) by centrifugal force as the gas flows down the inside wall of the second cylinder, 3) when it flows through the liquid stream departing the outlet of the second cylinder, and 4) by centrifugal force as the gas flows in a circular manner up and out the outside cylinder top outlet.

Alternate forms of the apparatus are taught including, 1) an apparatus having an additional fan wheel in the upper portion of the outside cylinder, to increase the velocity of the encircling gas in the outside cylinder, and to increase the capacity of gas flow through the apparatus, 2) a filter can be added optionally in the liquid stream being re-circulated in the apparatus, 3) the motor can be installed outside of the inlet pipe to allow the re-circulation of the liquid to be inside the gas inlet pipe, 4) the fan wheel and re-circulating liquid can be designed such that additional mixing can take place before the gas leaves the first fan wheel, 5) the outside cylinder outlet can be designed to operate like a cyclone, 6) grooves can be added to the bottom of the second cylinder outlet to divide the liquid stream into many small streams at the second cylinder outlet and provide better mixing of the gas and liquid, 7) the fan wheel can be provided with a rotating pumping case extending down below the liquid surface in a specially provided second liquid reservoir to eliminate the need for a pump, 8) muffler means can be added to the inlet and/or outlet of the scrubber to reduce noise generated by the scrubber, and with the gas inlet from the top of the scrubber, 9) an impeller can be added to the motor shaft to pump liquid up to the fan wheel through a non-rotating pump case.

The present invention has many advantages including the ability to clean a gas stream by wetting it with a liquid by utilizing a combination of forces, such as: impacting the surface of a flowing liquid stream with the stream of gas to be cleaned; centrifugally subjecting the gas stream to a very high gravitational force to cause heavier particulates and molecules to gravitate out and mix with a flowing liquid stream; flowing the gas at a high velocity through a flowing stream or liquid; and applying additional centrifugal force to the scrubbed stream of gas.

The foregoing has outlined rather broadly the features and technical advantages of the present invention in order that the detailed description of the various embodiments of the invention that follows can be better understood. Additional features and advantages of the invention which form the subject of the claims of the invention will be described hereinafter.

BRIEF DESCRIPTION OF THE DRAWINGS

For a more complete understanding of the present invention, and the advantages thereof, reference is now made to the following descriptions taken in conjunction with the accompanying drawings, in which:

FIG. 17 is an isometric view that schematically shows a portion of the scrubber of the present invention, showing the shape of the liquid surface in the scrubber when the scrubber is in operation, and a shelf located in a proximity of the liquid surface.

DETAILED DESCRIPTION OF THE INVENTION

Figure 1:
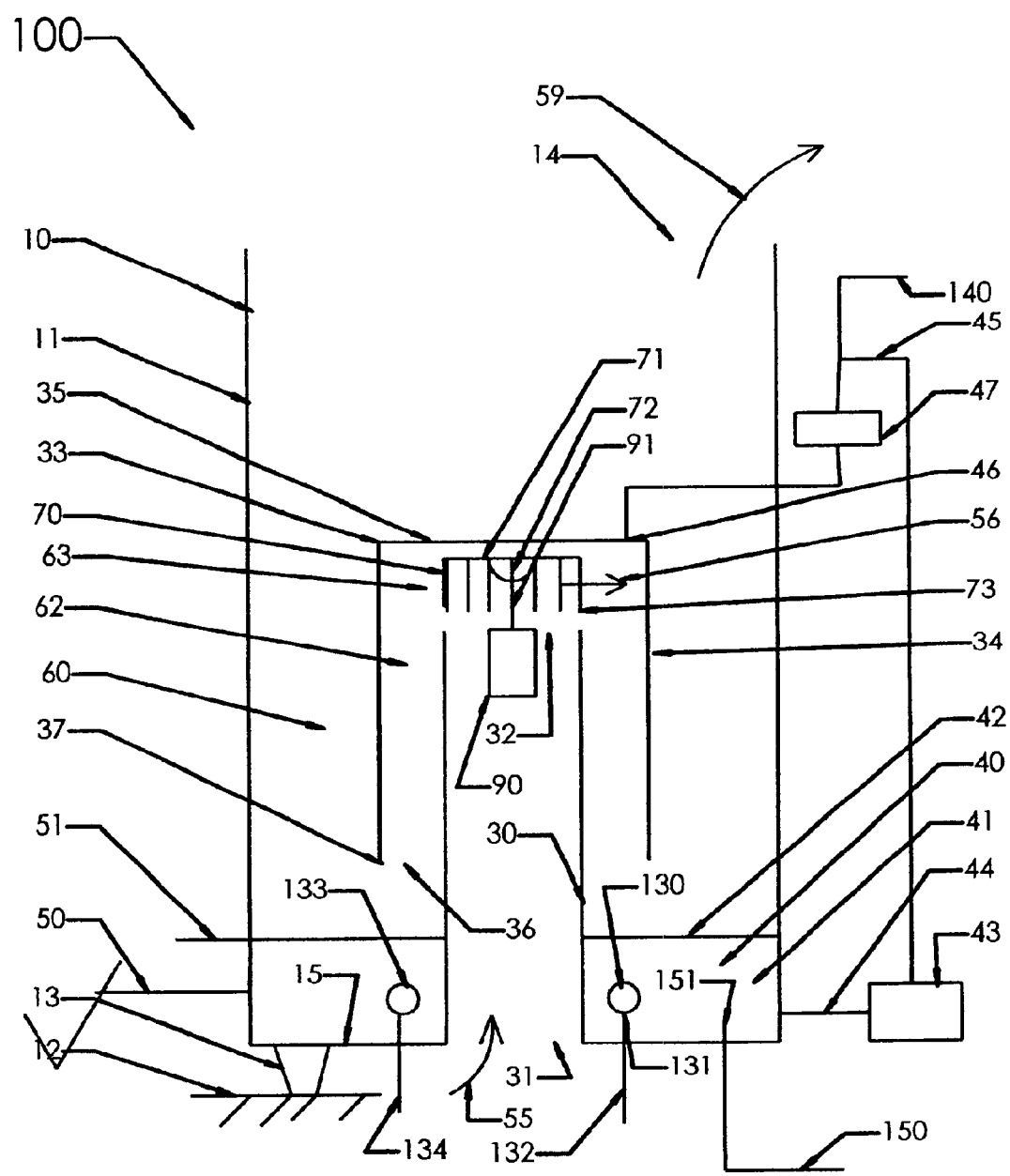
FIG. 1 is a schematic side view of a gas scrubber of the present invention with the gas inlet at the bottom of the scrubber and the motor in the inlet line.

Refer now to the drawings wherein depicted elements are not necessarily shown to scale and wherein like or similar elements are designated by similar reference numerals in the several figures.

FIG. 1 is a schematic side view of one embodiment of a gas scrubber of the present invention, generally denoted by the numeral 100. Scrubber 100 includes a container 10 having circular outside cylinder wall 11 with a bottom wall 15, a top circular outlet opening 14, and liquid reservoir 40 for holding liquid 41 having a liquid surface 42 that provides space 60 above surface 42 and below opening 14. Bottom wall 15 is provided with a centrally positioned circular inlet opening 31 that is attached to a circular inlet cylinder 30 that extends up through the liquid reservoir and has an outlet opening 32 positioned above the surface 42.

Since the scrubbed gas rotates out space 60 to outlet 14, at a high rotational rate, free liquid droplets in the gas are centrifugally forced against wall 11. These droplets coalesce and gravitate down to the liquid surface 42. Accordingly, wall 11 and space 60 serve as a cyclone and will be referred to hereinafter as cyclone wall 11 and cyclone space 60.

Scrubber 100 is also provided with a fan wheel 70, connected to shaft 91 by base hub 72 and rotated by motor 90, and has back plate 71 with fan blades 73, that are positioned proximate outlet 32, to draw gas through opening 31, inlet cylinder 30, and inlet cylinder outlet 32.

Circular scrubbing cylinder 33 is positioned inside the cyclone space 60 and encircles inlet cylinder 30 and fan wheel 70. Scrubbing cylinder 33 provides scrubbing space 62, between the inside of wall 34 of scrubbing cylinder 33 and the outside wall of inlet cylinder 30, and fan wheel space 63, below the top closure 35 of scrubbing cylinder 33 and outlet opening 32 of inlet cylinder 30. Scrubbing cylinder 33 has wall 34, bottom outlet opening 36, with outlet rim 37, positioned above surface 42, and top closure wall 35 positioned above wheel 70, as shown.

Scrubber 100 is additionally provided with pump 43, having inlet pipe 44 connected to reservoir 40 and outlet pipe 45 connected through the top wall 35 to discharge liquid on the top inside of wall 34 at 46. Only one point 46 is shown to simplify the drawing, however, a manifold having several points for injecting the liquid around the top inside periphery of wall 34 is sometimes desired to better distribute the flow of liquid equally down the inside of wall 34. Optional filter 47 may also be provided in series with outlet pipe 45. Filter 47 may have a replaceable membrane that can be replaced periodically to remove particulates and insects that may be in the inlet gas.

Leg 13 is provided for Scrubber 100, to support wall 15 a suitable distance above level 12, to provide a passage way for gas to flow below bottom wall 15 to inlet 31. Only one leg 13 is shown in FIG. 1, to simplify the drawing, it being understood that the provision of additional legs, or support means as required, is well known. Also, support means for motor 90, cylinder 33, filter 47, and pump 43 are not shown in the drawings, since they are well known by those familiar with the art. However, it should be noted that in order to minimize friction and pressure drop, the supports for motor 90 and cylinder 33 can be small rods attaching motor 90 to the inside wall of cylinder 30 and cylinder 33 to the inside of cyclone wall 11 or floor 15.

Since some of the liquid, in the operation of Scrubber 100, is vaporized in most gases and not recovered in the scrubber, Scrubber 100 is usually considered as a user of liquid and means for supplying makeup liquid is desired. This makeup means, inlet pipe 50 connected to reservoir 40, can include level control means with a supply of liquid. Alternately, a controlled flow, slightly greater than the consumption of the scrubber, can be provided to pipe 50 and over flow pipe 51 can be provided to allow the excess dirty liquid to be disposed of in order to maintain the desired surface level 42. This alternate method of supplying excess makeup liquid assures that the scrubbing liquid is always clean and may reduce the need for filter 47.

Liquid can also be supplied by providing a second liquid reservoir, having a controlled liquid level, connected to the first liquid reservoir. This controlled liquid level may be maintained by a sealed movable container with an outlet opening in its bottom that is submerged beneath the controlled liquid surface. When the controlled liquid level is lowered beneath the movable container outlet opening, the vacuum in the movable container is broken allowing additional liquid to raise the controlled liquid level. The movable container can be refilled as needed. Liquid level controlling means is well known by those skilled in the art, so is not discussed further here.

Figure 12:
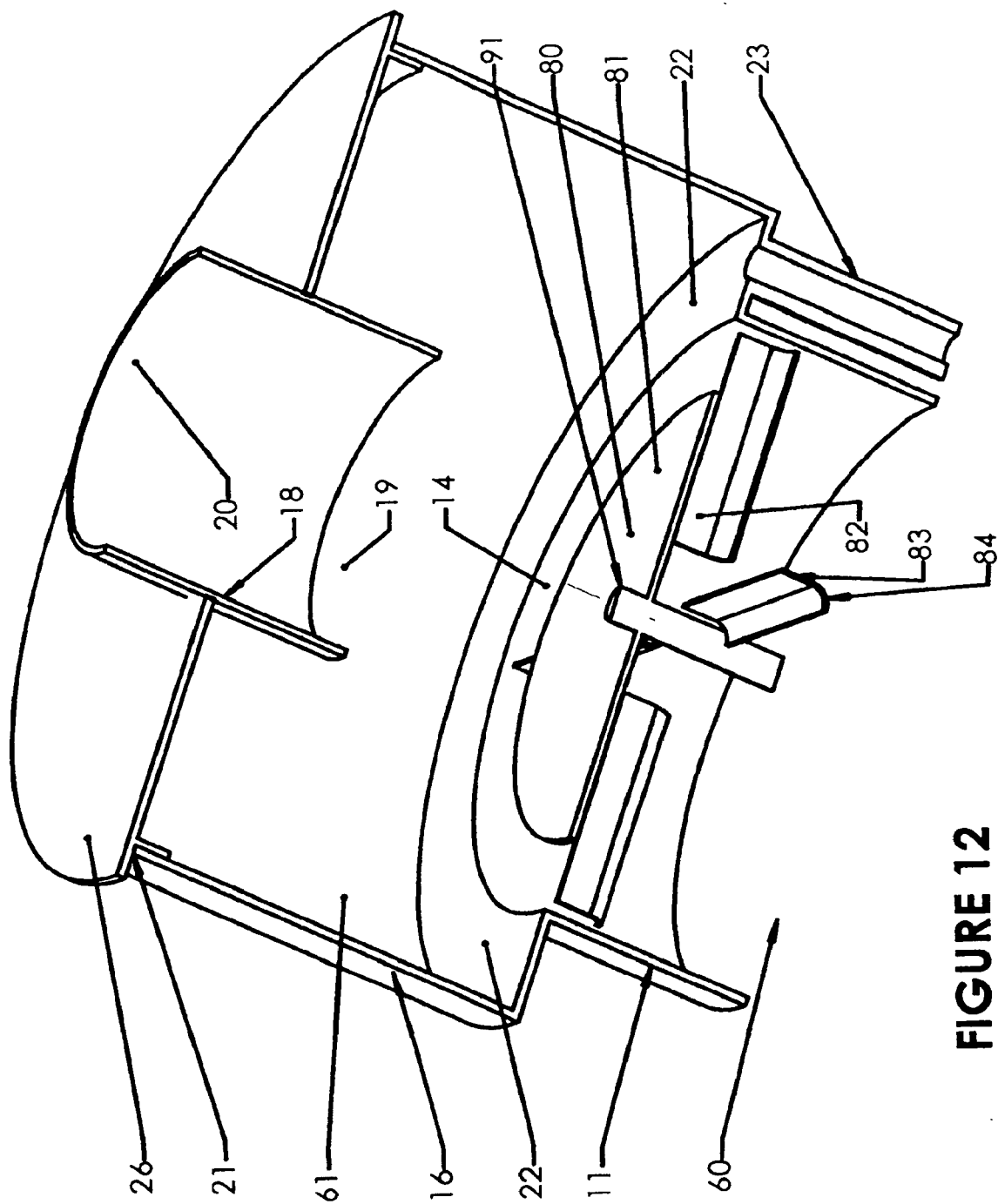
FIG. 12 is an isometric view schematically showing an alternate form for the scrubber outlet and an optional second fan wheel to increase the efficiency and gas flow.

A second fan wheel 80, attached to shaft 91 extending through top closure 35, may be optionally provided, in cyclone space 60, to help draw additional gas through the scrubber and to increase the centrifugal separation of particulates in the gas by increasing the rotational rate of the gas in cyclone space 60. This is shown by FIG. 12 and described later herein.

The operation of Scrubber 100 is summarized as follows. Cylinder 10 contains liquid 41 and surface 42 is maintained by level control means 50 and 51. Motor 90 rotates fan wheel 70, connected to shaft 91, to draw gas through inlet 31, as shown by arrow 55, inlet cylinder 30, outlet opening 32 and across fan blades 73 as shown by arrow 56. Pump 43 pumps liquid 41 from reservoir 40 through inlet pipe 44, outlet pipe 45, filter 47 and outlet 46 to the top of scrubbing space 62 of scrubbing cylinder 33.

The drawn gas flows tangentially off blades 73 at a very high velocity and impacts the stream of liquid flowing down scrubbing space 62 against the inside of wall 34 of scrubbing cylinder 33. Since the gas is flowing tangentially off blades 73, the mixture of gas and liquid flows at a high velocity in a circular and downward direction along the inside of wall 34 of scrubbing cylinder 33, causing the gas to flow on a thin layer of liquid, and the high circular flow causes a high centrifugal force to be applied to particulates and heavier parts in the gas stream. This high velocity gas stream, impacting the liquid stream, and high centrifugal force of the gas stream against the surface of the flowing liquid stream, causes particulates and heavier parts in the gas stream to mix with the liquid stream, to wet the particulates and combine the particulates with the liquid stream, as it flows down the inside of wall 34.

The high centrifugal force of the mixture flowing out outlet 36 centrifugally causes the mixture to flow horizontally off the outlet edge 37 of cylinder wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 in cyclone space 60 at a high rotational rate causing a high centrifugal force of the gas which allows the upper portion of cyclone wall 11 to serve as a cyclone. This causes free liquid droplets to impinge against the inside wall of cyclone wall 11 and to coalesce and gravitate back down to liquid surface 42. Scrubbed gas then flows out outlet 14 as shown by arrow 59.

Accordingly, gas is scrubbed by scrubbing a stream of gas with a liquid stream as it impacts the liquid stream at a high velocity at the discharge of the fan blades, further impacting and centrifugally mixing the heavier parts in the gas stream with a stream of liquid as the mixture flows at a high rotational rate down the inside of a scrubbing cylinder, flowing the gas and liquid mixture at a high velocity across a liquid surface, scrubbing the gas still further by flowing the gas through a high velocity stream of flowing liquid, and finally, centrifugally separating free liquid droplets and wetted particulates in a cyclone before exhausting the scrubbed gas from the scrubber.

Figure 14:
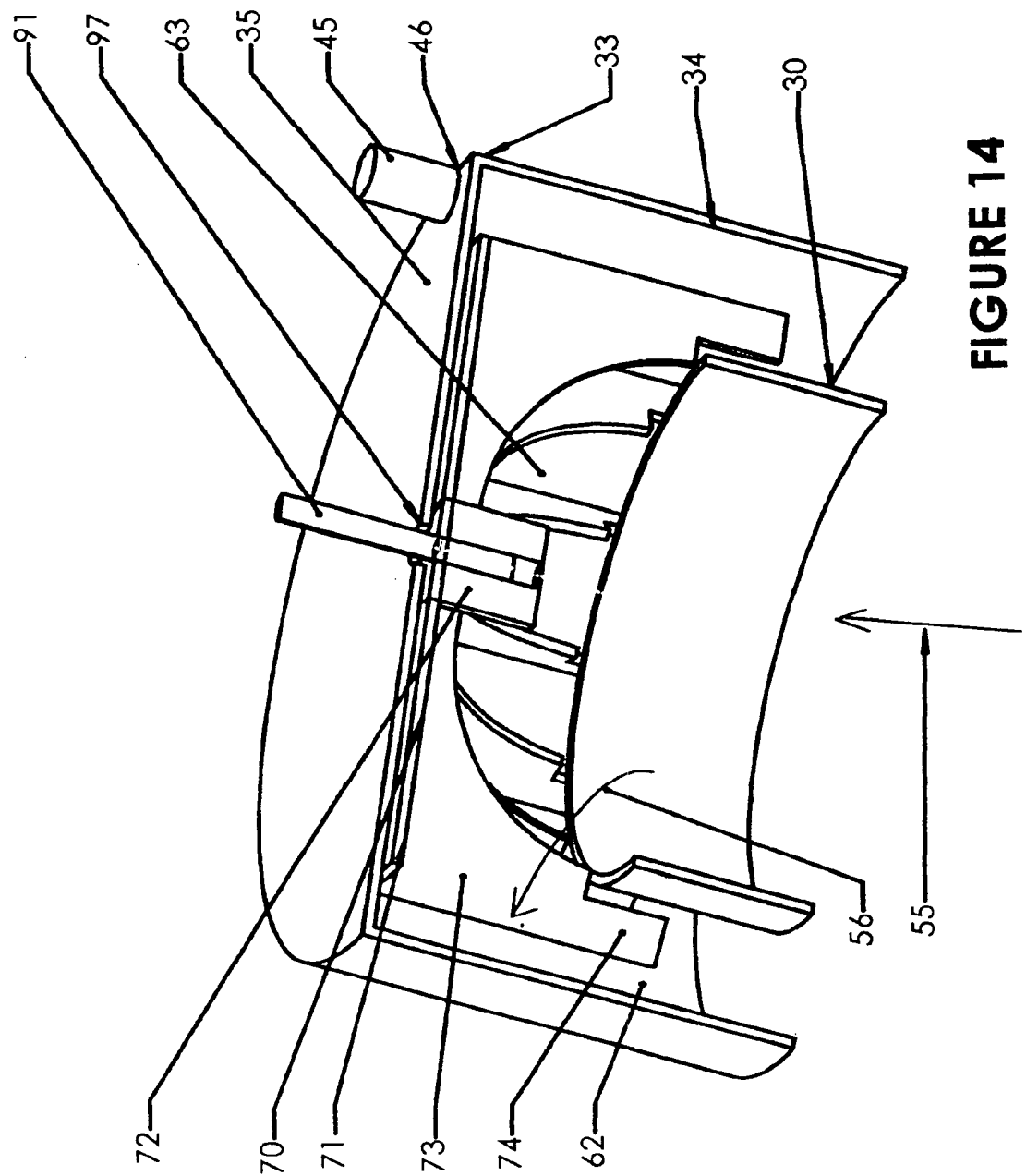
FIG. 14 is an isometric view schematically showing one proposed form of a fan blade used by the gas scrubbers of FIGS. 1 and 2 of the present invention.

Although the fan wheel used by the scrubber of the present invention can be of a variety of shapes and design philosophies, it is usually preferred to use a fan wheel having cage, paddle, or radial blades in order to maximize the velocity and direction of the gas flow against the liquid stream and the inside of wall 34 of the scrubber. FIG. 14 is an isometric drawing, cut diametrically in half with its front half removed so the inside can be seen, schematically showing a proposed shape of the blades used by the fan wheel and the proposed positioning of the blades in fan wheel space 63 and scrubbing space 62, in relationship with inlet cylinder 30, partially shown, and scrubbing cylinder 33 with top wall 35 and side wall 34, also partially shown in FIG. 14.

The fan wheel 70, in FIG. 14, is rotated by shaft 91. The motor that rotates the shaft, which can be mounted above top wall 35 with the shaft extending down through a sleeve seal 97 in top wall 35, or can be mounted in inlet cylinder 30, as used in scrubber 100 of FIG. 1, and supported by inlet cylinder 30, is not shown in FIG. 14. Pump discharge pipe 45 passing through top wall 35 at point 46 is also partially shown.

Back plate 71 is attached to shaft 91, by fan base 72, and rotates therewith. Radial type fan blades 73 are supported by back plate 71 and rotate therewith in order to draw gas up through partially shown inlet cylinder 30 as shown by arrow 55. Fan wheel 70, of FIG. 14, is shown rotating in a counter-clockwise direction, looking up in the direction of flow arrow 55, and, accordingly, the gas flows tangentially off the blade tips, at substantially the same velocity as the peripheral speed of the blade tips, in the direction of rotation shown by arrow 56.

A large number of blades may be used to equally distribute the gas impacting the liquid stream on the inside of wall 34 of the scrubbing cylinder and to increase and cause the velocity of the gas to approach the peripheral velocity of the blade tips. Also, blades 73 may optionally be provided with extensions 74, that extend down into scrubbing space 62, to maintain the rotational velocity in scrubbing space 62.

In one embodiment, the space between the inside of wall 34 of the scrubbing cylinder and the outlet rims of blades 73 and the outside wall of inlet cylinder 30 should be minimized in order to increase the velocity and the rate of rotational spin around the inside of scrubbing cylinder wall 34.

Figure 2:
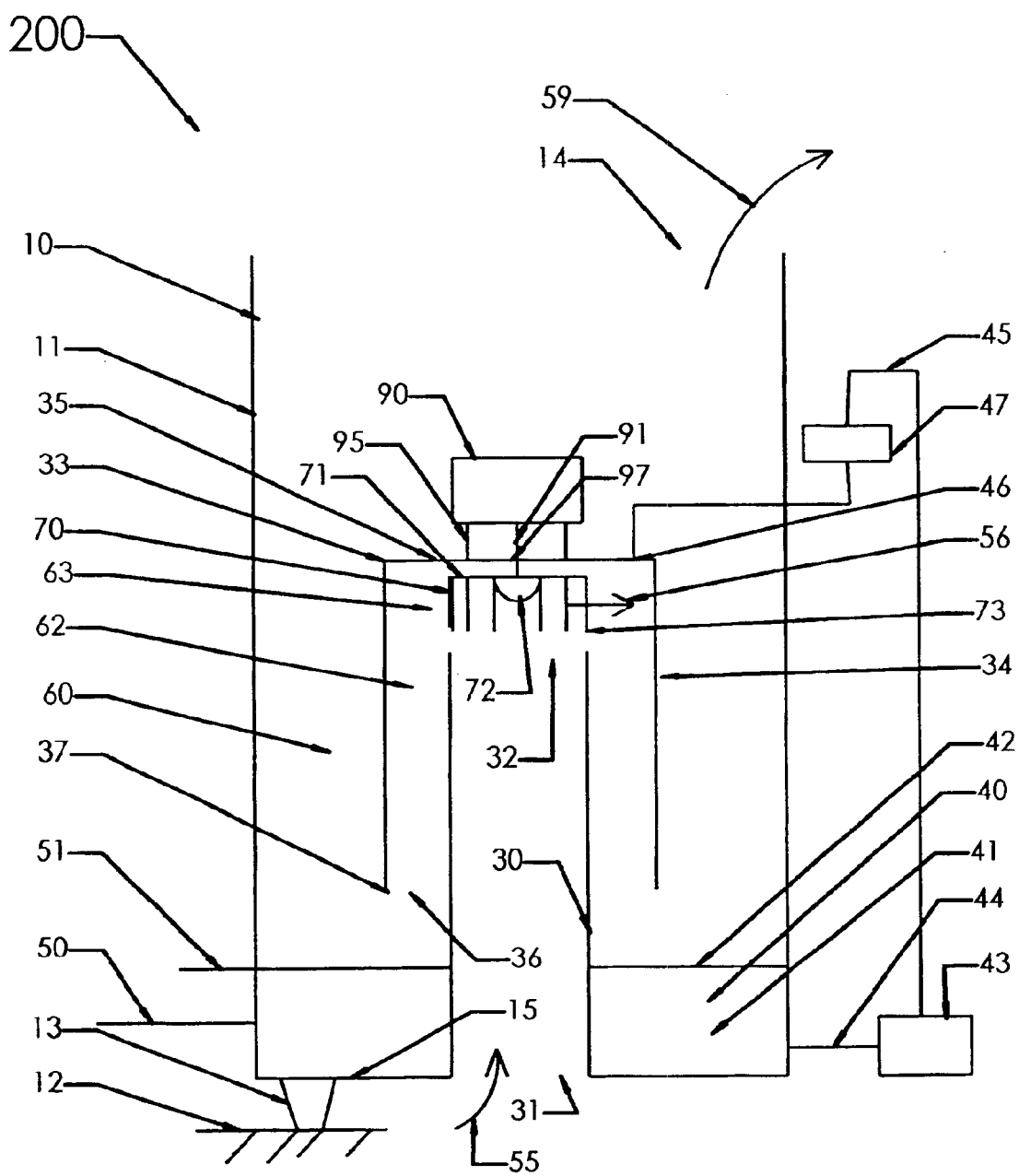
FIG. 2 is a schematic side view of the gas scrubber of FIG. 1 with the gas inlet at the bottom of the scrubber but with the motor in the outlet of the scrubber.

FIG. 2 is a schematic side view of an alternate embodiment or arrangement of the gas scrubber of FIG. 1, generally denoted by the numeral 200. The items of scrubber 200 of FIG. 2 have the same numbers as the items of scrubber 100 of FIG. 1. The only difference of scrubber 200, from that of scrubber 100, is that the motor 90 of scrubber 200 is positioned in cyclone space 60 and the motor 90 of scrubber 100 is positioned in inlet pipe 30. Positioning motor 90 in cyclone space 60, as shown by FIG. 2, is sometimes preferred since it sometimes reduces the pressure drop in inlet pipe 30 and it offers alternate ways to supply liquid to the fan wheel.

Please refer to the definitions of the items of FIG. 1 for the definitions of the items of FIG. 2. Also refer to the operation of scrubber 100 of FIG. 1 for the operation of scrubber 200 of FIG. 2.

Figure 3:
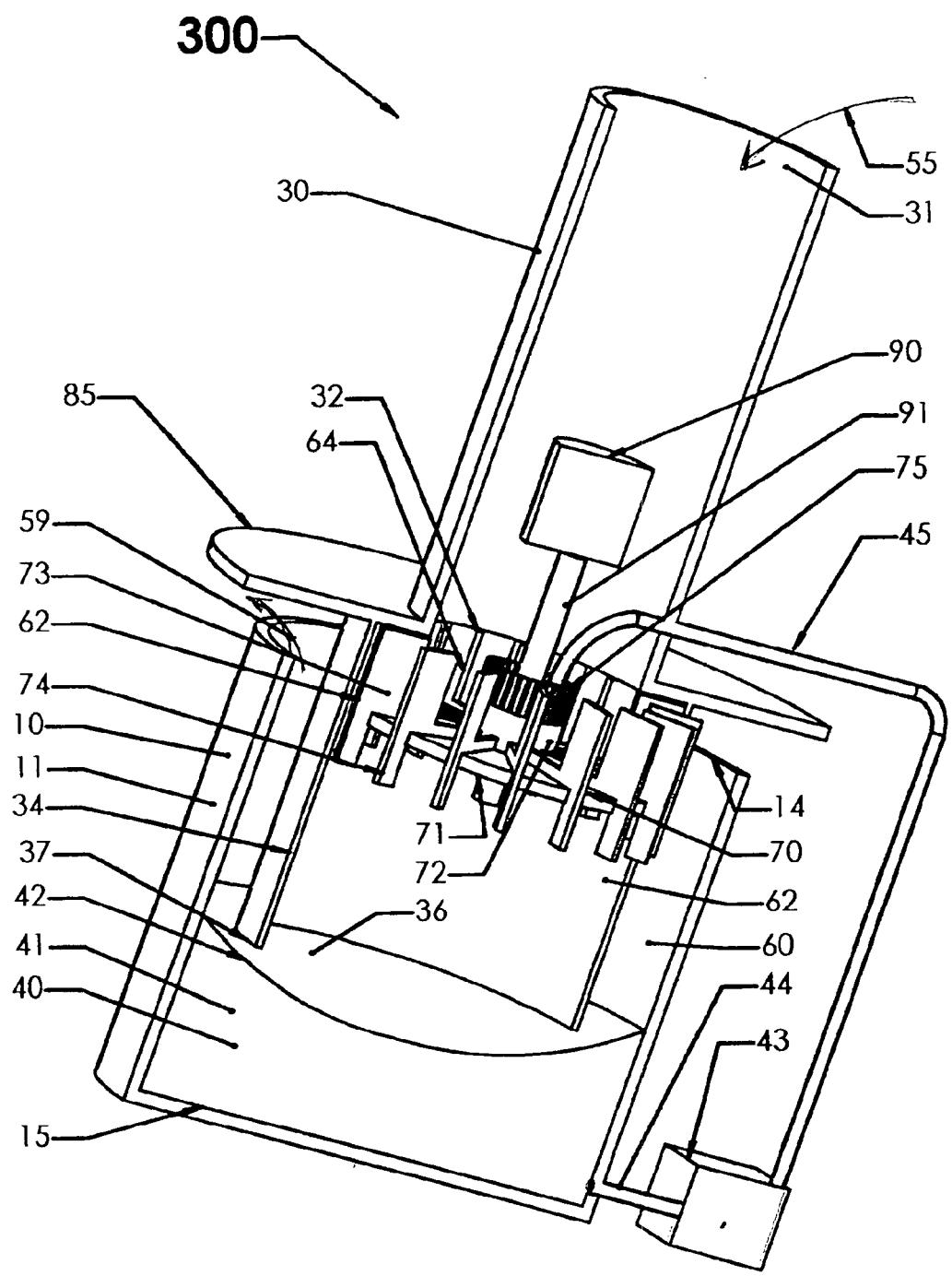
FIG. 3 is an isometric side view schematically showing another alternate version of the scrubber of FIG. 1 but having the gas inlet at the top of the scrubber.

FIG. 3 of the drawings shows another embodiment or combination for the scrubber of the present invention, generally denoted by the numeral 300. Scrubber 300 has the same parts (except for parts 64, 74, and 85) with the same numbers as scrubber 200. The main difference of scrubber 300 from scrubber 200 is that the gas inlet of scrubber 300 is from above the scrubber and the gas inlet of scrubber 200 is from below the scrubber.

Protrusions 75 have been added to the fan base hub 72 to distribute and accelerate the liquid into small streams through space 64 positioned between protrusions 75 and fan blades 73. Deflection wall 85 has been added to direct the gas outlet away from the gas inlet.

The operation of Scrubber 300 is summarized as follows. Cylinder 10 contains liquid 41 and surface 42 is maintained by level control means similar to that of scrubber 100. Motor 90 rotates fan wheel 70, connected to shaft 91, to draw gas through inlet 31, as shown by arrow 55, inlet cylinder 30, outlet opening 32, and across fan blades 73. Pump 43 pumps liquid 41 from reservoir 40 through inlet pipe 44, outlet pipe 45, and to the top of fan base hub 72, between the shaft 91 and hub protrusions 75.

Protrusions 75 disperse the liquid into many small streams and discharge the streams tangentially at a high velocity through space 64 to mix and scrub the incoming gas stream.

The drawn gas flows tangentially off blades 73 at a very high velocity and impacts the stream of liquid and gas against the inside of wall 34 and flowing down scrubbing space 62. Since the gas and liquid is flowing tangentially off blades 73, the mixture of gas and liquid flows at a high velocity and the gas is scrubbed as it flows in a circular and downward direction along the inside wall 34 of scrubbing cylinder 33, causing the gas to flow on a thin layer of liquid, and the high circular flow causes a high centrifugal force to be applied to particulates and heavier parts in the gas stream. This high velocity gas stream, impacting the liquid stream, and high centrifugal force of the gas stream against the surface of the flowing liquid stream, causes particulates and heavier parts in the gas stream to mix with the liquid stream, to wet the particulates and combine the particulates with the liquid stream, to further scrub the gas, as it flows down the inside of wall 34.

The high centrifugal force of the mixture flowing out outlet 36 centrifugally causes the mixture to flow horizontally off the outlet edge 37 of cylinder wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 in cyclone space 60 at a high rotational rate causing a high centrifugal force of the gas which allows the upper portion of cyclone wall 11 to serve as a cyclone. This causes free liquid droplets to impinge against the inside wall of cyclone wall 11 and to coalesce and gravitate back down to liquid surface 42. Scrubbed gas then flows out outlet 14 as shown by arrow 59.

Figure 4:
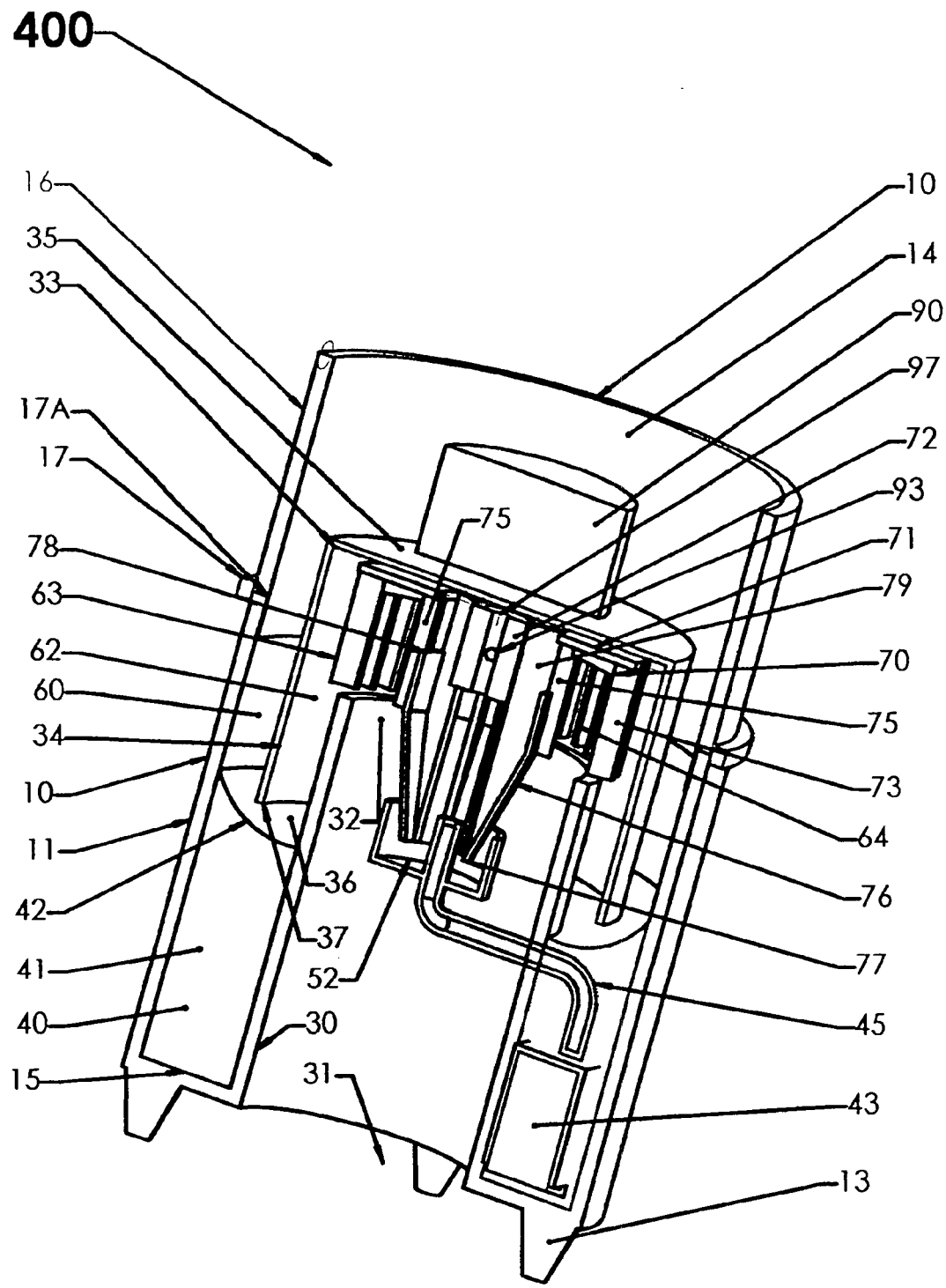
FIG. 4 is an isometric side view of an alternate version of the scrubber of the present invention schematically showing a rotating pumping case attached to the fan wheel for pumping the liquid to the fan wheel from a second reservoir.

Like parts of scrubber 400 of FIG. 4 have the same numbers as scrubber 100 of FIG. 1 except for fan wheel 70, with its rotatable pumping case 76, blades 79, and associated second liquid reservoir 52. Also, the motor of scrubber 100 is mounted beneath outlet 32 inside of inlet cylinder 30 and the motor 90 of scrubber 400 is mounted in cyclone space 60 above top wall 35 of scrubbing cylinder 33, to allow for the addition of second liquid reservoir 52 and pumping case 76. Accordingly, please refer to the above descriptions of the parts of FIG. 1 for the other parts of FIG. 4.

In FIG. 4, second liquid reservoir 52 supplies liquid to the inlet of rotating pumping case 76. Pumping case 76 is attached to rotating fan wheel 70 and rotates therewith, and has inlet opening 77 and outlet opening 78. Outlet opening 78 is larger than inlet opening 77 to allow any liquid flowing in inlet opening 77 to be centrifugally pumped up and out of outlet opening 78. The second liquid reservoir 52 is supplied with liquid by pump 43, positioned in reservoir 40 for FIG. 4, through pipe 45. The rotation of case 76 centrifugally pumps liquid up and out of the top rim 78 of case 76 and to blades 75.

Scrubber 400 has scrubbing cylinder 33 that provides for fan wheel space 63, between opening 32 and top closure 35, and scrubbing space 62, between wall 34 and wall 30. FIG.

4 also shows bottom wall 15, back plate 71, base 72, set screw 93, and shaft seal 97. The motor shaft is not shown in FIG. 4 for clarity.

Figure 15:
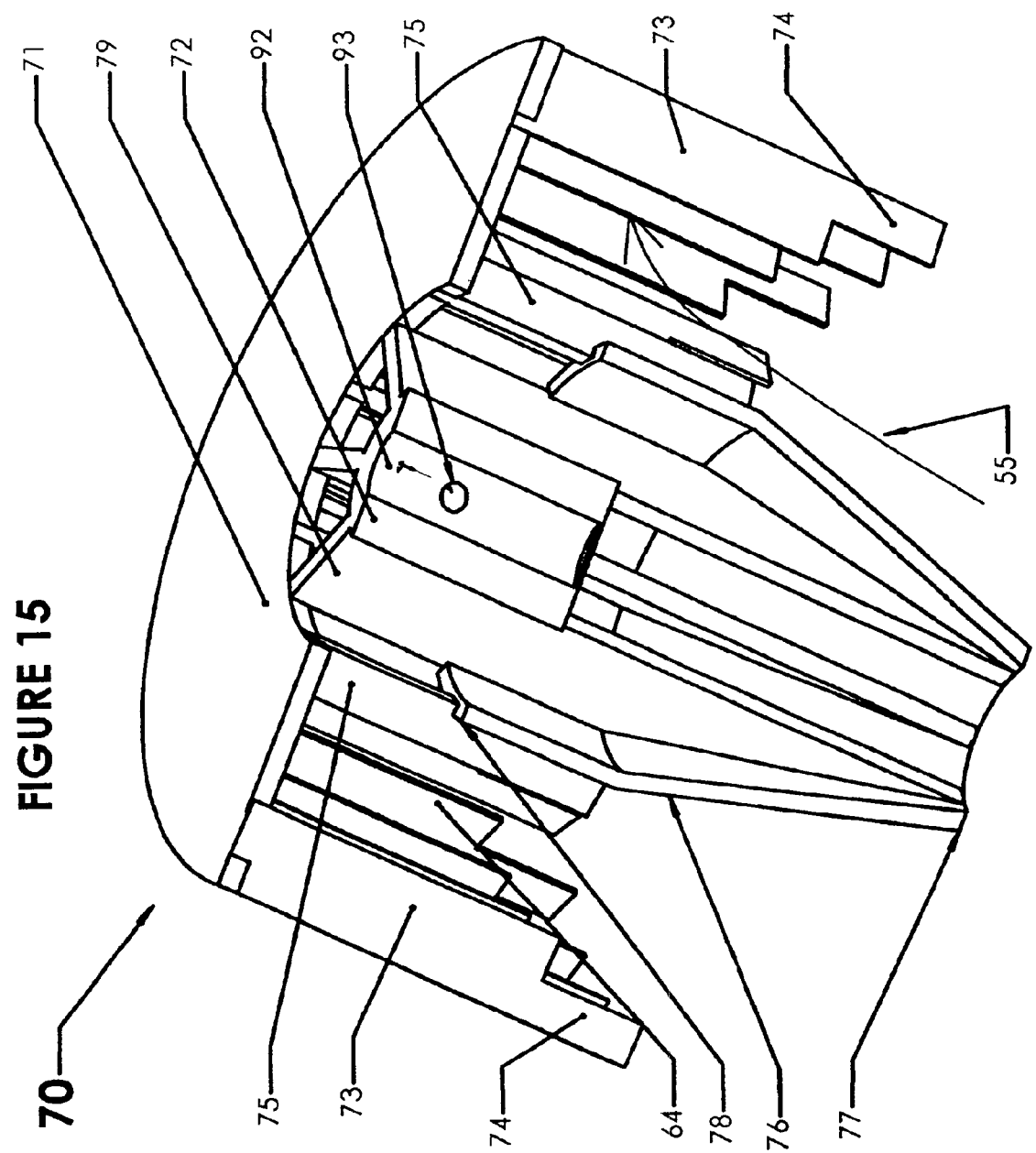
FIG. 15 is an isometric view schematically showing one proposed form of a fan blade used by the scrubbers of FIGS. 4 and 5 of the present invention.

Please refer to FIG. 15 and the following descriptions of fan wheel 70, used in FIG. 4. FIG. 15 is an isometric drawing, which is shown diametrically cut with the front half removed, that schematically shows the insides of fan wheel 70. Fan wheel 70, of FIG. 15, includes fan base hub 72 having shaft hole 92 and set screw keyway 93, to secure the motor shaft. The shaft and motor are not shown in FIG. 15. Base 72 is attached to pumping case impeller blades 79, and blades 79 attach to case 76 and back plate 71. Back plate 71 supports outer fan blades 73. Mid blades 75 are attached to case 76 and back plate 71. The blades and walls are tapered and designed in a manner that allows fan wheel 70 to be made in a two piece injection mold.

Case 76 has inlet opening 77 and outlet opening 78 that is larger than inlet opening 77. Inlet opening 77 is submerged beneath the liquid surface and the rotating case, together with pumping impellers 79, rotates the liquid that flows in inlet 77 and centrifugally forces the liquid up and out outlet 78.

Mid blades 75 receive the liquid from case outlet 78 and centrifugally flattens the liquid stream and discharges it, tangentially and at a high velocity, in multiple thin layers of thin liquid streams and droplets off the outside rim of blades 75. There is a space 64 between mid blades 75 and outer blades 73 and these high velocity thin liquid streams and droplets mix with the incoming gas in space 64 to scrub the gas. The liquid and gas is impacted by outer blades 73 and additional streams of liquid and gas are discharged, tangentially and at a high velocity, off the outside rims of blades 73, to further scrub the gas. These additional streams of liquid and gas are impacted against the liquid coated inside wall 34, not shown in FIG. 15, to still further scrub the gas. Optionally, outer blades 73 can have extensions 74 to extend down the inside of wall 34, in scrubbing space 62, to maintain the circular velocity of liquid and gas in scrubbing space 62.

The operation of fan wheel 70 of FIG. 15 is summarized as follows. Fan wheel 70 is rotated by a shaft and motor and pumping case inlet 77 is submerged beneath a liquid surface. The motor, shaft, and liquid surface, are not shown in FIG. 15. Liquid flows, by gravity, through inlet 77 and the rotating case, aided by pumping blades 79, centrifugally pumps the liquid up and out outlet 78, which is larger than inlet 77. The liquid flows to mid blades 75 which spread the liquid and discharges it tangentially in thin high velocity streams and droplets through space 64 where it mixes and scrubs the incoming gas. The incoming gas and liquid streams are impacted by outer blades 73 which discharge them tangentially at a high velocity to further scrub the gas. The liquid and gas streams are then impacted against a wall of flowing liquid, not shown, to still further scrub the gas. Blade extensions 74, of blades 73, extending down in scrubbing space 62 of FIG. 4, help to maintain the circular velocity of the gas and liquid in space 62.

Referring back to FIG. 4, the operation of scrubber 400 of FIG. 4 is summarized as follows. Container 10 contains liquid 41 in reservoir 40, and surface 42 is maintained by a level control means, not shown, similar to the one used on scrubber 100. Fan wheel 70 is rotated by motor 90 (the shaft is not shown in FIG. 4) to draw gas through inlet 31, cylinder 30, and through outlet opening 32 and across fan blades 73. Pump 43 pumps liquid 41 from reservoir 40 (since the pump is submerged, the suction pipe is not shown) through outlet pipe 45, and to the second reservoir 52. The pumping capacity of pumping case 76 is designed to be greater than the pumping capacity of pump 43 to prevent reservoir 59 from overflowing.

Liquid is pumped centrifugally by rotating case 76, and pumping impellers 79, from reservoir 52 and discharged out the outlet rim 78 of case 76 to mid blades 75. Mid blades 75 spreads the liquid and discharges it tangentially in small droplets, at a high velocity, through space 64 to blades 73. The drawn gas is first mixed with the liquid in space 64.

The drawn gas and liquid flow tangentially off blades 73 at a very high velocity and impact the inside of wall 34. Since the gas and liquid is flowing tangentially off blades 73, the mixture of gas and liquid flows at a high rotational rate down scrubbing space 62 and along the inside of wall 34 of cylinder 33, causing the gas to flow on a thin layer of liquid, and the high circular flow causes a high centrifugal force to be applied to particulates and heavier parts in the gas stream. This high centrifugal force of the gas stream against the surface of the flowing liquid stream inside of wall 34 causes particulates and heavier parts in the gas stream to mix with the liquid stream, to wet the particulates and combine the particulates with the liquid stream, as it flows down scrubbing space 62 along the inside of wall 34.

The high rotational force of the liquid and gas mixture flowing out outlet 36 causes surface 42 to centrifugally climb the inside of wall 11, as shown by the drawing, and impact surface 42, instead of wall 11, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside wall of cyclone wall 11 in cyclone space 60 at a high rotational rate causing a high centrifugal force of the gas which allows the upper portion of wall 11 to serve as a cyclone. This causes free liquid droplets to impinge against the inside of cyclone wall 11 and to coalesce and gravitate back down to liquid surface 42. Scrubbed gas then flows out outlet 14.

Figure 5:
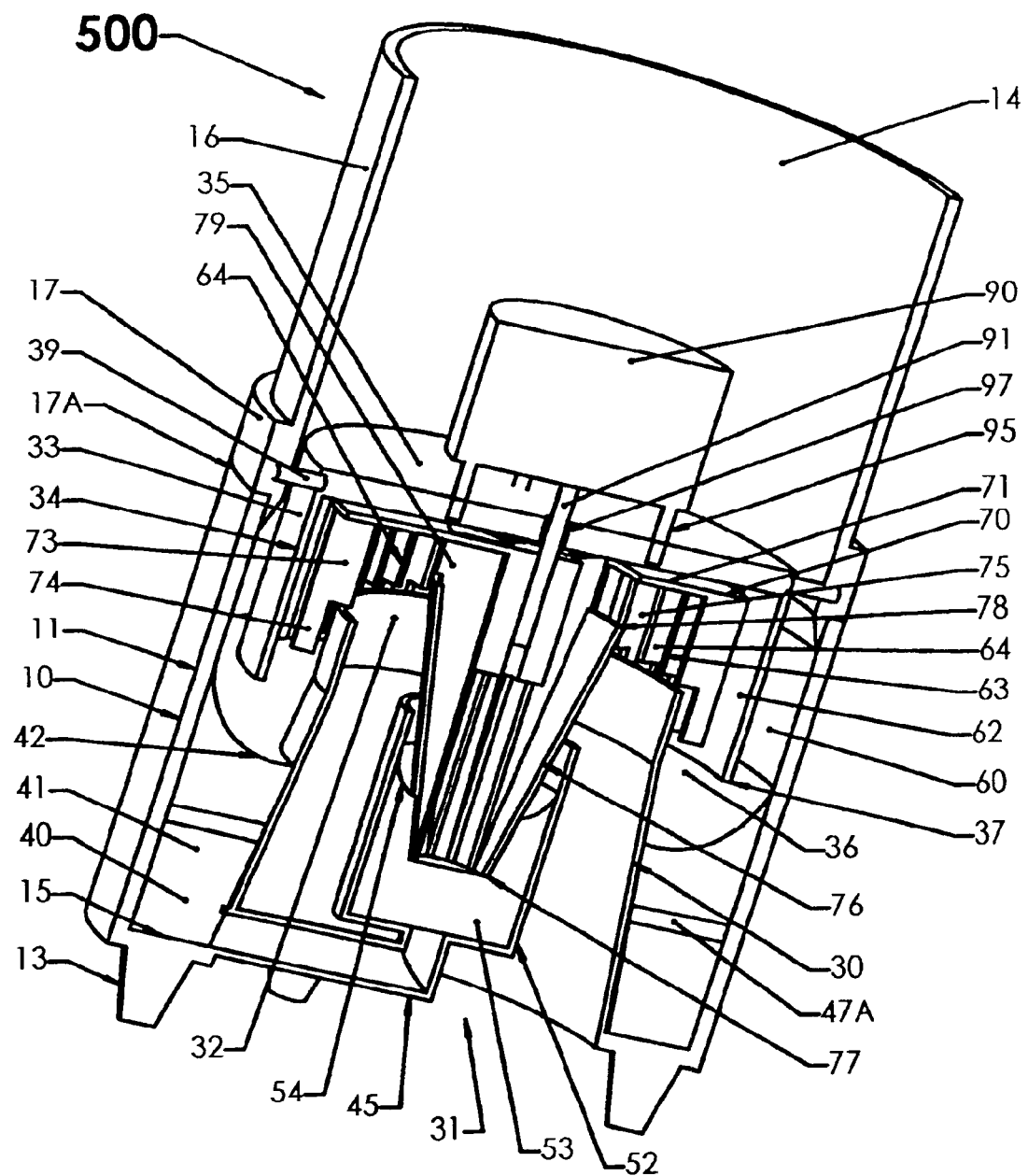
FIG. 5 is an isometric side view of an alternate version of the scrubber of FIG. 4.

FIG. 5 of the drawings shows another combination for the present invention, generally denoted by the numeral 500. Scrubber 500 has the same parts with the same numbers as scrubber 400, except that the recirculation pump has been omitted in scrubber 500. Accordingly, please refer to the above descriptions for the other parts of scrubber 500.

In scrubber 500, side wall 34 of scrubbing cylinder 33 has been shortened and liquid surface 42 has been raised in order to allow liquid 41 to flow by gravity to second reservoir 52 through pipe 45. This provides a more economical, although in some cases less efficient, scrubber and may be desired for simple uses, such as in the home.

In FIG. 5, scrubber 500 has container 10 with side cyclone wall 11 and bottom wall 15 to provide liquid reservoir 40 for holding liquid 41 having surface 42, and to further provide for cyclone space 60 above surface 42. Bottom wall 15 is provided with centrally positioned gas inlet opening 31 which is attached to inlet cylinder 30. Inlet cylinder 30 has outlet opening 32 positioned above surface 42. Fan wheel 70 is provided with back plate 71 that is attached to fan blades 73 and shaft 91 for rotation therewith.

Pumping case 76 is provided with inlet opening 77 and outlet opening 78 and is attached to back plate 71 by pump impellers 79 to rotate therewith. Liquid reservoir 52 is positioned to receive liquid flow, by gravity, from reservoir 40 and provide liquid surface 54. Inlet opening 77 of case 76, which is smaller than outlet opening 78, is positioned below surface 54 to allow liquid to flow in opening 77 and to be pumped by rotating case 76 up and out outlet 78.

Scrubbing cylinder 33 is provided with wall 34 that provides fan space 63 to encircle fan wheel 70 and the top of inlet cylinder 30. Scrubbing cylinder 33 is provided with top enclosure 35 and sleeve 97 to allow shaft 91 to pass through. Motor 90 drives shaft 91 and support 39 supports cylinder 33 by wall 16. Upper cylinder wall 16 is joined to lower wall 11 at joint 17A and held in place by retaining ring 17. This is to allow the upper cylinder, motor, fan wheel, and scrubbing cylinder to be removed in one piece for easy cleaning and maintenance.

Since the rotation of liquid 41 in reservoirs 40 and 52 sometimes creates an undesirable harmonic motion, baffles, not shown are sometimes positioned in reservoirs 40 and 52. These baffles are positioned beneath surfaces 42 and 54, but are high enough to prevent the rotating liquid from starting a harmonic motion. These baffles are sometimes desired in any of the scrubbers described herein.

It is sometimes desirable to filter the liquid during operation so filter cartridge 47A can optionally be placed in reservoir 40, between surface 42 and pipe 45, as shown in FIG. 5. This filter cartridge is sometimes very useful in home use to prevent insects and such from plugging pipe 45 and inlet opening 77. This filter cartridge can be optionally used in most of the scrubbers of the present invention. The cartridge can be removable for easy cleaning. A support for the cartridge is not shown in the drawing.

The operation of scrubber 500 is summarized as follows. Container 10 contains liquid 41 and surface 42 is maintained by a level control means, not shown, similar to the one used on scrubber 100. Motor 90 and shaft 91 rotates fan wheel 70 to draw gas through inlet 31, cylinder 30, and through opening 32 across space 64 and fan blades 73. Liquid 41 flows from reservoir 40 through inlet pipe 45, to reservoir 52.

Liquid is pumped centrifugally by rotating pump case 76 from reservoir 52 through inlet opening 77 and discharged off the rim of outlet opening 78 to blades 75. Blades 75 flatten the liquid and discharge it at a high velocity through space 64, where it mixes with the incoming gas, to blades 73. The gas and liquid flows tangentially off blades 73 at a very high velocity and impacts the inside of wall 34. Since the gas and liquid are flowing tangentially off blades 73, the mixture of gas and liquid flows at a high rotational rate down scrubbing space 62 and along the inside of wall 34 of scrubbing cylinder 33, causing the gas to flow on a thin layer of liquid, and the high circular flow causes a high centrifugal force to be applied to particulates and heavier parts in the gas stream. This high centrifugal force of the gas stream against the surface of the flowing liquid stream inside of wall 34, causes particulates and heavier parts in the gas stream to mix with the liquid stream, to wet the particulates and combine the particulates with the liquid stream, as it flows down the inside of wall 34.

The high centrifugal force of the liquid and gas mixture flowing out outlet 36 centrifugally causes the mixture to flow horizontally off the outlet edge 37 of wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 and 16 in cyclone space 60 at a high rotational rate causing a high centrifugal force of the gas which allows the upper portion of wall 11 and 16 to serve as a cyclone. This causes free liquid droplets to impinge against the inside of wall 11 and 16 and to coalesce and gravitate back down to liquid surface 42. Scrubbed gas then flows out outlet 14.

Figure 6:
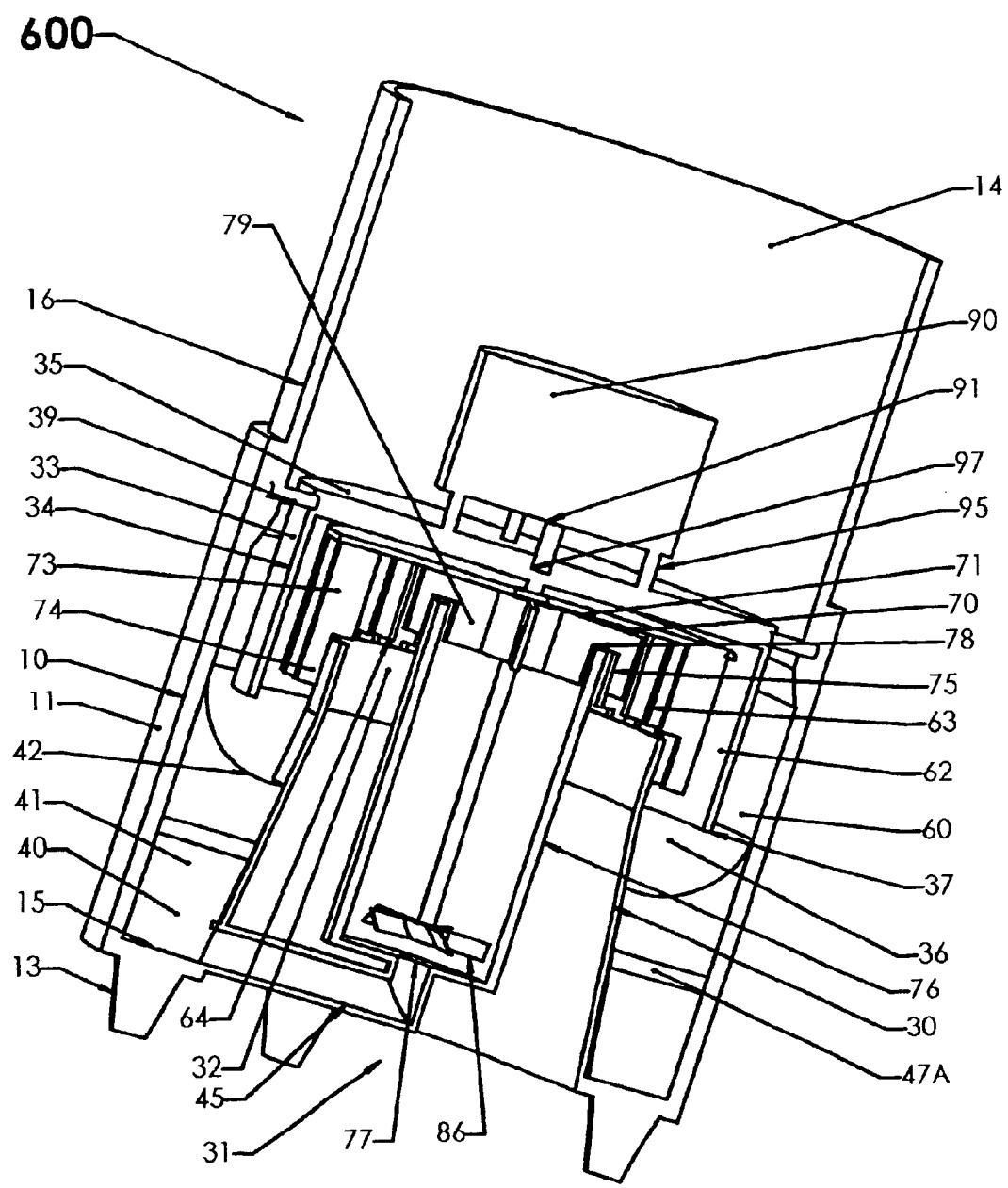
FIG. 6 is an isometric side view of an alternate version of the scrubber of FIG. 5 schematically showing a rotating impeller in a non-rotating pumping case.

FIG. 6 of the drawings shows another combination for the present invention, generally denoted by the numeral 600. Scrubber 600 has the same parts with the same numbers as scrubber 100, except that the recirculation pump has been modified in scrubber 600. Accordingly, please refer to the above descriptions for the parts not described below for scrubber 600.

In scrubber 600, pumping case 76 is stationary and does not rotate, yet pump impellers 86 are attached to shaft 91 for rotation inside of case 76 to pump liquid from case inlet 77 to case outlet 78. Liquid 41 flows by gravity to case inlet 77 through pipe 45. Inside blades 79 extend down the inside of outlet 78 of case 76 to rotate the liquid and centrifugally sling the liquid off the rim of outlet 78 to mid blades 75 that further discharges the liquid at a high velocity through space 64 to scrub the incoming gas.

In FIG. 6, scrubber 600 has container 10 with side cyclone wall 11 and bottom wall 15 to provide liquid reservoir 40 for holding liquid 41 having surface 42, and to further provide for cyclone space 60 above surface 42. Bottom wall 15 is provided with centrally positioned opening 31 which is attached to inlet cylinder 30. Inlet cylinder 30 has outlet opening 32 positioned above surface 42. Fan wheel 70 is provided with back plate 71 that is attached to fan blades 73 and shaft 91 for rotation therewith.

Non-rotating pumping case 76 is provided with inlet opening 77, which is attached to pipe 45 to receive liquid from reservoir 40, and outlet opening 78 positioned proximate the mid-section of fan wheel 70. Rotating pump impellers 86, attached to shaft 91, are positioned proximate inlet 77 to pump liquid up to outlet 78 of case 76.

Scrubbing cylinder 33 is provided with wall 34 that provides fan space 63 to encircle fan wheel 70 and the top of inlet cylinder 30. Scrubbing cylinder 33 is provided with top enclosure 35 and sleeve 97 to allow shaft 91 to pass through. Motor 90 drives shaft 91 and support 39 supports cylinder 33 by wall 16.

It is sometimes desirable to filter the liquid during operation so filter cartridge 47A can optionally be placed in reservoir 40, between surface 42 and pipe 45, as shown in the FIG. 6 drawing. This filter cartridge is sometimes very useful in home use to prevent insects and such from plugging pipe 45 and inlet opening 77. This filter cartridge can be optionally used in most of the scrubbers of the present invention. The cartridge can be removable for easy cleaning. A support for the cartridge is not shown in the drawing.

The operation of scrubber 600 is summarized as follows. Container 10 contains liquid 41 and surface 42 is maintained by a level control means, not shown, similar to the one used on scrubber 100. Motor 90, mounted above top wall 35 and supported by supports 95, and shaft 91 rotates fan wheel 70 and pump impeller 86 to draw gas through inlet 31, cylinder 30, and through opening 32 and across fan blades 73 and to pump liquid form inlet 77 to outlet 78 of pumping case 76. Liquid 41 flows from reservoir 40 through inlet pipe 45, to inlet 77.

The pumped liquid at outlet 78 of case 76 is rotated by blades 79 and centrifugally forced at a high velocity off the outlet rim 78 to mid blades 75. Blades 75 flatten the liquid and discharge it at a high velocity through space 64, where it mixes with the incoming gas for scrubbing, to blades 73.

The gas and liquid flows tangentially off blades 73 at a very high velocity and impacts the inside of wall 34. Since the gas and liquid are flowing tangentially off blades 73, the mixture of gas and liquid flows at a high rotational rate down scrubbing space 62 and along the inside of wall 34 of scrubbing cylinder 33, causing the gas to flow on a thin layer of liquid, and the high circular flow causes a high centrifugal force to be applied to particulates and heavier parts in the gas stream. This high centrifugal force of the gas stream against the surface of the flowing liquid stream inside of wall 34, causes particulates and heavier parts in the gas stream to mix with the liquid stream, to wet the particulates and combine the particulates with the liquid stream, as it flows down the inside of wall 34.

The high centrifugal force of the liquid and gas mixture flowing out outlet 36 centrifugally causes the mixture to flow horizontally off the outlet edge 37 of wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 and 16 in cyclone space 60 at a high rotational rate causing a high centrifugal force of the gas which allows the upper portion of walls 11 and 16 to serve as a cyclone. This causes free liquid droplets to impinge against the inside of walls 11 and 16 and to coalesce and gravitate back down to liquid surface 42. Scrubbed gas then flows out outlet 14.

Figure 7:
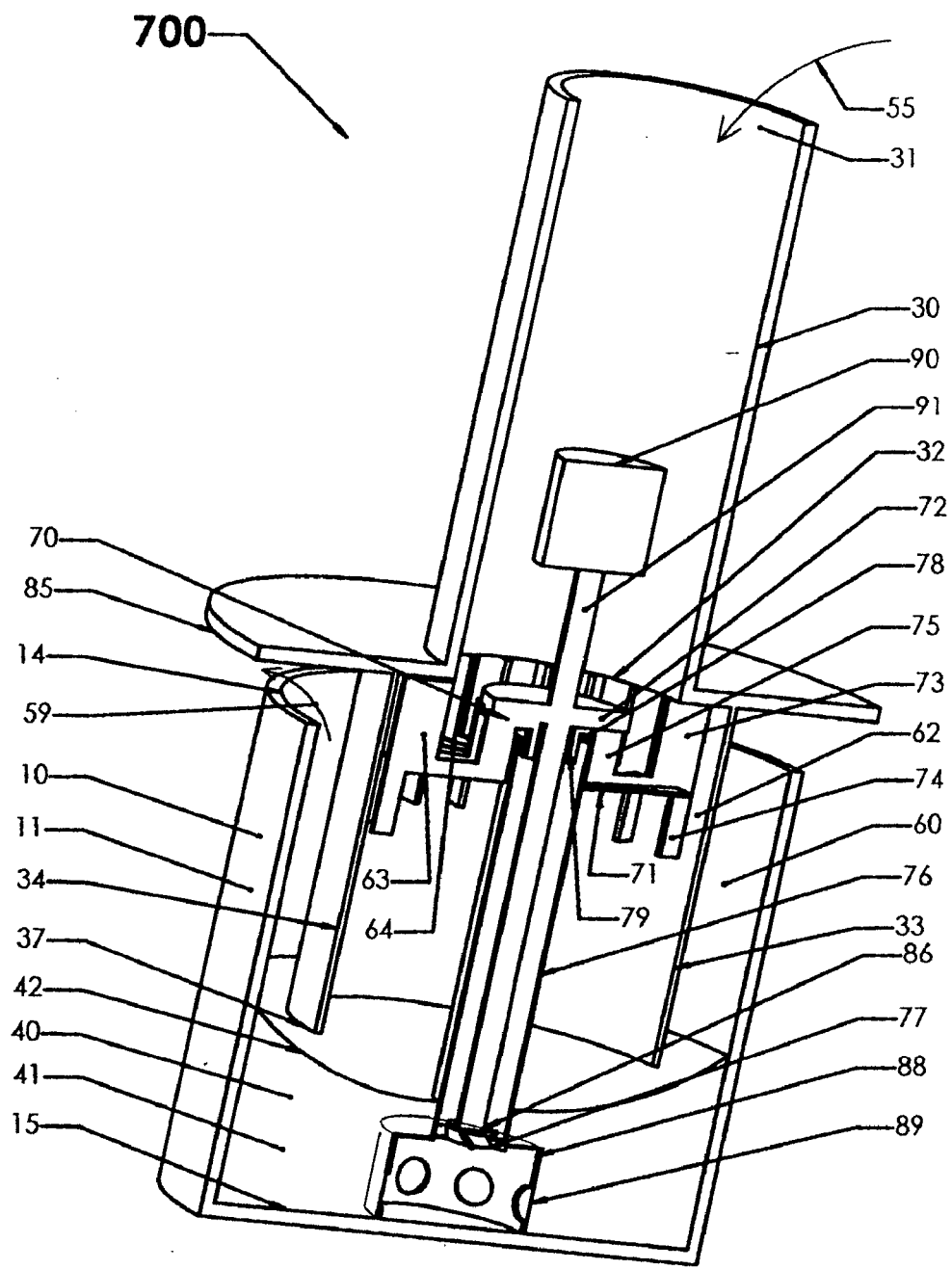
FIG. 7 is an isometric side view schematically showing another alternate version of the scrubber of the present invention.

FIG. 7 of the drawings shows another combination for the present invention, generally denoted by the numeral 700. Scrubber 700 has the same parts with the same numbers as scrubber 100 of FIG. 1 and scrubber 600 of FIG. 6. The main difference of scrubber 700 from that of scrubber 600 is that the inlet of scrubber 600 is at the bottom of the scrubber and the inlet of scrubber 700 is at the top of the scrubber, removing the need for pipe 45 of FIG. 6. Accordingly, please refer to the above descriptions for the parts not described below for scrubber 700.

In scrubber 700, pumping case 76 is stationary and pump impellers 86 are attached to shaft 91 for rotation inside of case 76 to pump liquid from case inlet 77 to case outlet 78. Pump case support 88 supports pump case 76 and is provided with flowing path 88 to allow liquid 41 to flow by gravity to case inlet 77 from reservoir 40. Inside blades 79 extend down the inside of outlet 78 of case 76 to rotate the liquid and centrifugally discharges the liquid off the rim of outlet 78 to mid blades 75 that further discharges the liquid at a high velocity through space 64 to scrub the incoming gas.

In FIG. 7, scrubber 700 has container 10 with side cyclone wall 11 and bottom wall 15 to provide liquid reservoir 40 for holding liquid 41 having surface 42, and to further provide for cyclone space 60 above surface 42. Inlet cylinder 30 has inlet opening 31 and outlet opening 32 which is attached to deflector wall 85. Deflector wall 85 is provided to deflect the outlet gas flow away from the gas inlet. Fan wheel 70 is provided with back plate 71 that is attached to fan blades 73 and shaft 91 by base hub 72 for rotation therewith.

Non-rotating pumping case 76, which is supported by support 88, is provided with inlet opening 77 to receive liquid from reservoir 40, and outlet opening 78 positioned proximate the mid-section of fan wheel 70. Rotating pump impellers 86, attached to shaft 91, are positioned proximate inlet 77 to pump liquid up from inlet 77 to outlet 78 of case 76.

Scrubbing cylinder 33 is provided with wall 34 that provides fan space 63 to encircle fan wheel 70. Motor 90 drives shaft 91. Supports for motor 90 are not shown, it being understood that those skilled in the art can readily provide supports for motor 90 and wall 85.

The operation of scrubber 700 is summarized as follows. Container 10 contains liquid 41 in reservoir 40 and surface 42 is maintained by a level control means, not shown, similar to the one used on scrubber 100. Motor 90 and shaft 91 rotates fan wheel 70 and pump impellers 86 to draw gas through inlet 31, cylinder 30, and through opening 32 and across fan blades 73 and to pump liquid form inlet 77 to outlet 78 of pumping case 76. Liquid 41 flows from reservoir 40 through paths 88 to inlet 77.

The pumped liquid at outlet 78 of case 76 is rotated by blades 79 and centrifugally forced off the outlet rim 78 to mid blades 75. Blades 75 flatten the liquid and discharge it at a high velocity through space 64, where it mixes with the incoming gas for scrubbing, to blades 73. The gas and liquid flows tangentially off blades 73 at a very high velocity and impacts the inside of wall 34. Since the gas and liquid is flowing tangentially off blades 73, the mixture of gas and liquid flows at a high rotational rate down scrubbing space 62 and along the inside of wall 34 of scrubbing cylinder 33, causing the gas to flow on a thin layer of liquid, and the high circular flow causes a high centrifugal force to be applied to particulates and heavier parts in the gas stream. This high centrifugal force of the gas stream against the surface of the flowing liquid stream inside of wall 34, causes particulates and heavier parts in the gas stream to mix with the liquid stream, to wet the particulates and combine the particulates with the liquid stream, as it flows down the inside of wall 34.

The high centrifugal force of the liquid and gas mixture flowing out outlet 36 centrifugally causes the mixture to flow horizontally off the outlet edge 37 of wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 in cyclone space 60 at a high rotational rate causing a high centrifugal force of the gas which allows the upper portion of wall 11 to serve as a cyclone. This causes free liquid droplets to impinge against the inside of wall 11 and to coalesce and gravitate back down to liquid surface 42. Scrubbed gas then flows out outlet 14 as shown by arrow 519.

Figure 8:
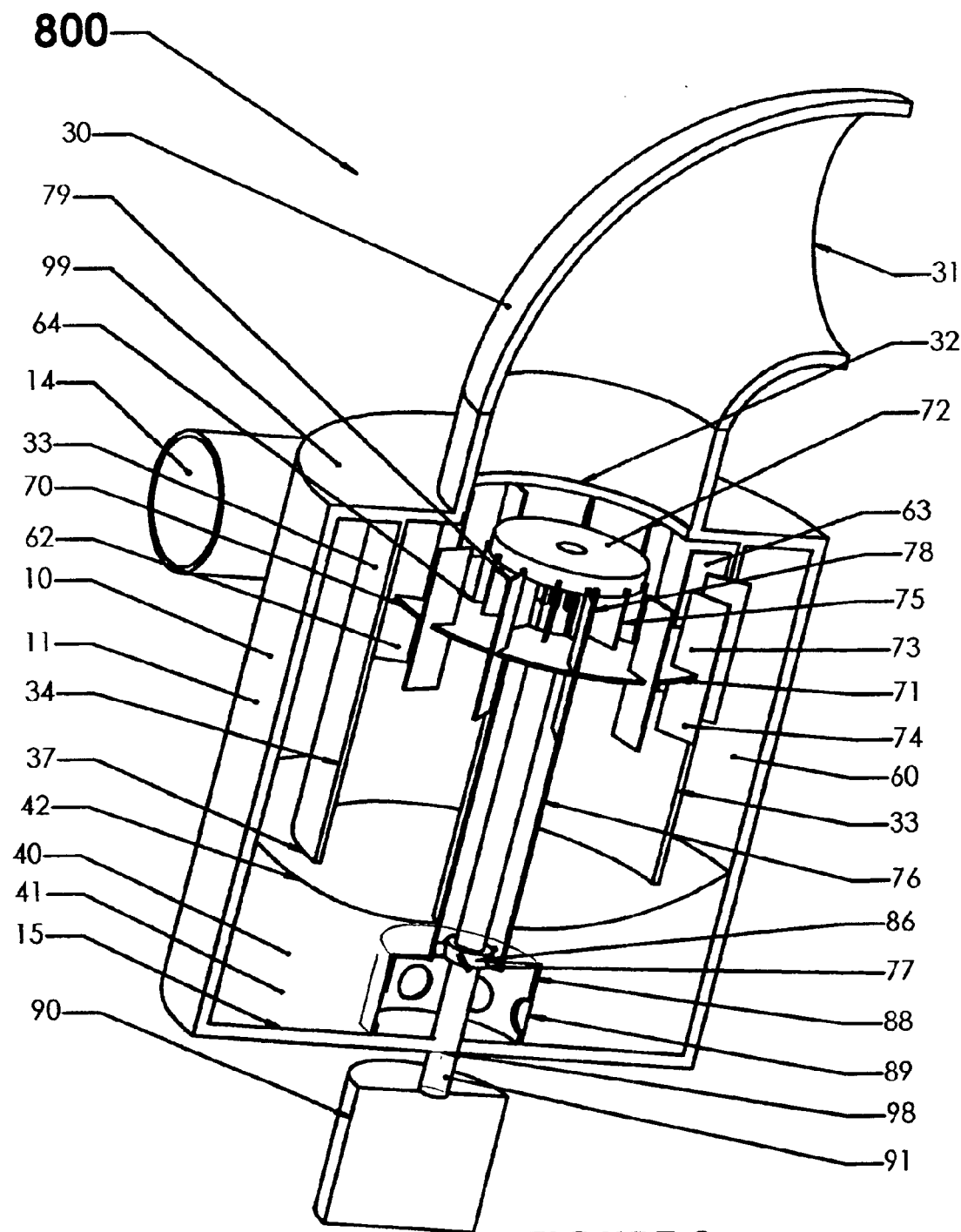
FIG. 8 is an isometric side view schematically showing another alternate version of the scrubber of the present invention.

FIG. 8 of the drawings shows another combination for the present invention, generally denoted by the numeral 800. Scrubber 800 has the same parts with the same numbers as scrubber 700 of FIG. 7 and scrubber 600 of FIG. 6. The main difference of scrubber 800 from that of scrubber 700 is that the inlet and outlet of scrubber 800 is directed in different directions than that of scrubber 700 and the motor of scrubber 800 is positioned outside of the scrubber. Accordingly, please refer to the above descriptions for the parts not described below for scrubber 800.

In scrubber 800, pumping case 76 is stationary and pump impellers 86 are attached to shaft 91 for rotation inside of case 76 to pump liquid from case inlet 77 to case outlet 78. Pump case support 88 supports pump case 76 and is provided with flowing path 88 to allow liquid 41 to flow by gravity to case inlet 77 from reservoir 40. Inside blades 79, attached to fan hub 72 for rotation therewith, extend down the inside of outlet 78 of case 76 to rotate the liquid and centrifugally discharge the liquid off the rim of outlet 78 to mid blades 75 that further discharges the liquid at a high velocity through space 64 to scrub the incoming gas.

Motor 90 is positioned outside of scrubber 800 below floor 15 and shaft 91 extends up through seal 98 in floor 15, support 88, impeller 86, pump case 76, and fan base hub 72, and is connected to impeller 86 and fan base hub 72 for rotating the fan and impeller. Supports for motor 90 and scrubber 800 are not shown in FIG. 8, it being understood that those skilled in the art can readily provide supports for motor 90 and scrubber 800.

In FIG. 8, scrubber 800 has container 10 with side cyclone wall 11 and bottom wall 15 to provide liquid reservoir 40 for holding liquid 41 having surface 42, and to further provide for cyclone space 60 above surface 42. Inlet cylinder 30 has inlet opening 31 and outlet opening 32 which is attached to top wall 99. Top wall 99 is connected to scrubber wall 34 and container wall 11. Fan wheel 70 is provided with back plate 71, outside fan blades 73, mid blades 75, and inside liquid pump blades 79, and is attached to shaft 91 by base hub 72 for rotation therewith.

Non-rotating pumping case 76, which is supported by support 88 having inlet path 89, is provided with inlet opening 77 to receive liquid from reservoir 40, and outlet opening 78 to convey liquid to fan space 62. Rotating pump impellers 86, attached to shaft 91, are positioned proximate inlet 77 to pump liquid up from inlet 77 to outlet 78 of case 76.

Scrubbing cylinder 33 is provided with wall 34 that provides fan space 63 to encircle fan wheel 70 and scrubbing space 62.

The operation of scrubber 800 is summarized as follows. Container 10 contains liquid 41 in reservoir 40 and surface 42 is maintained by a level control means, not shown, similar to the one used on scrubber 100. Motor 90 and shaft 91 rotates fan wheel 70 to draw gas through inlet 31, cylinder 30, and through opening 32 and across fan blades 73, and rotates impeller 86 to pump liquid form inlet 77 to outlet 78 of pumping case 76. Liquid 41 flows from reservoir 40 through support 88 to inlet 77.

The pumped liquid at outlet 78 of case 76 is rotated by blades 79 and centrifugally forced off the outlet rim 78 to mid blades 75. Blades 75 flatten the liquid and discharge it at a high velocity through space 64, where it mixes with the incoming gas for scrubbing, to blades 73. The gas and liquid flows tangentially off blades 73 at a very high velocity and impacts the inside of wall 34. Since the gas and liquid is flowing tangentially off blades 73, the mixture of gas and liquid flows at a high rotational rate down scrubbing space 62 and along the inside of wall 34 of scrubbing cylinder 33, causing the gas to flow on a thin layer of liquid, and the high circular flow causes a high centrifugal force to be applied to particulates and heavier parts in the gas stream. This high centrifugal force of the gas stream against the surface of the flowing liquid stream inside of wall 34, causes particulates and heavier parts in the gas stream to mix with the liquid stream, to wet the particulates and combine the particulates with the liquid stream, as it flows down the inside of wall 34.

The high centrifugal force of the liquid and gas mixture flowing out outlet 36 centrifugally causes the mixture to flow horizontally off the outlet edge 37 of wall 34 and sweep across surface 42, further scrubbing the gas with the liquid. Also, since the heavier liquid flows off edge 37 first, the gas flows through the liquid stream before entering space 60, again further scrubbing the gas with the liquid.

Gas then flows tangentially in a circular and upward direction along the inside of cyclone wall 11 in cyclone space 60 at a high rotational rate causing a high centrifugal force of the gas which allows the upper portion of wall 11 to serve as a cyclone. This causes free liquid droplets to impinge against the inside of wall 11 and to coalesce and gravitate back down to liquid surface 42. Scrubbed gas then flows out outlet 14 which is attached to cyclone space 60.

Figure 9:
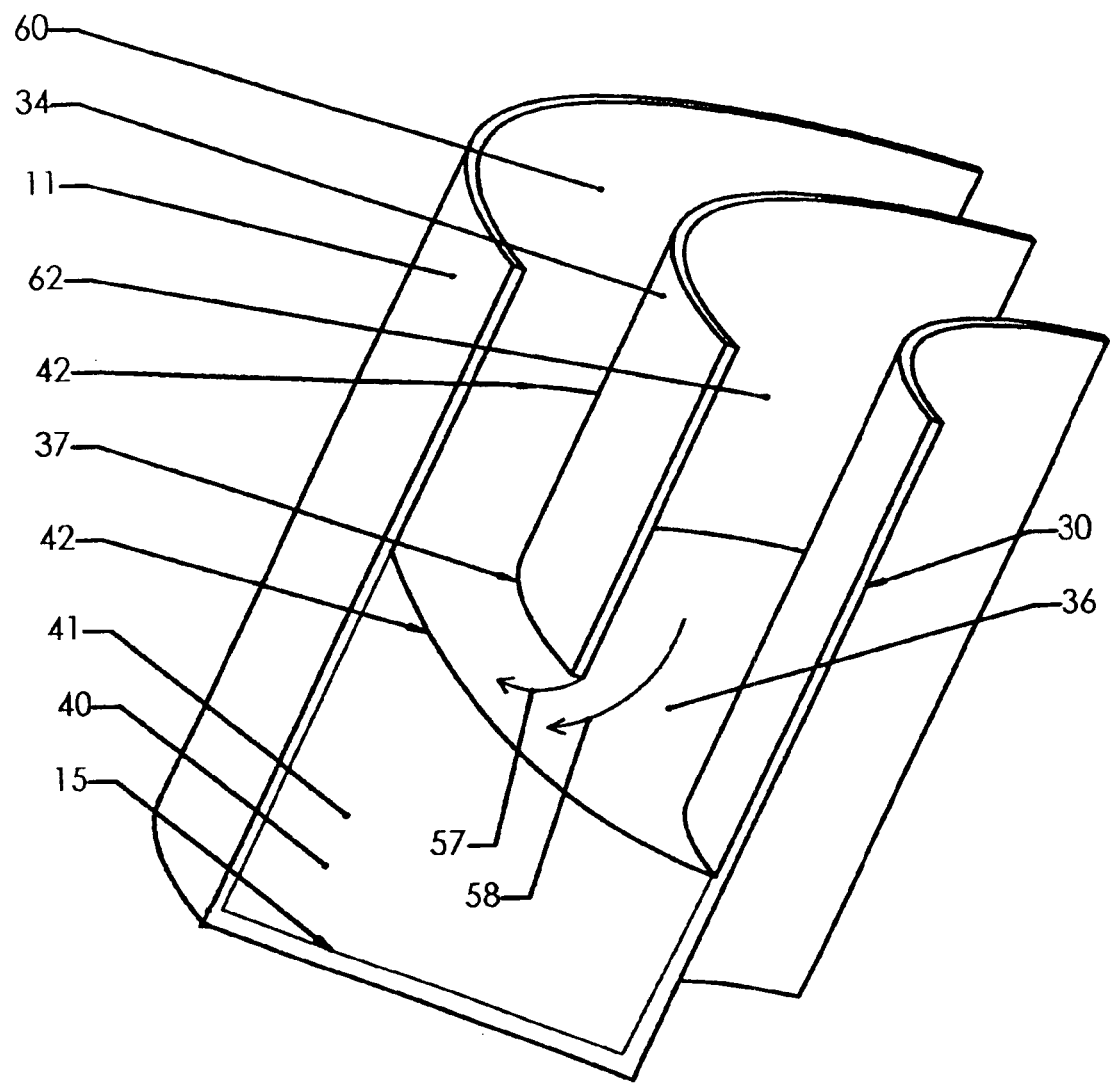
FIG. 9 is an isometric view that schematically shows a portion of the liquid reservoir of the scrubber of the present invention, showing the shape of the liquid surface in the scrubber when the scrubber is in operation and the effect that the shape has on the liquid and gas flow over the surface.

FIG. 9 of the drawings is an isometric view of the bottom left hand portion of the scrubber of FIG. 1. In FIG. 9, a bottom portion of side wall 11, bottom wall 15, reservoir 40 with liquid 41, inlet cylinder 30 and scrubbing cylinder wall 34, with rim 37, and scrubbing space 62, are shown. The flow of gas and liquid out of scrubbing cylinder outlet 36 impacts surface 42 and causes the liquid to rotate in the direction of rotation of the flowing gas and liquid stream. The rotation of liquid 41 centrifugally causes the surface of the liquid to vertically climb the side of cyclone wall 11, as shown by the drawing. This causes the liquid stream flowing off rim 37, and the gas stream flowing out opening 36 to impact the liquid surface, instead of wall 11, as shown by arrows 57 and 58. This flow results in more efficient and quieter operation and applies to all of the above scrubbers.

FIG. 17 of the drawings is an isometric view of the bottom left hand portion of the scrubber of FIG. 1 and has the same parts with the same numbers as FIG. 9. The only difference from FIG. 17 and FIG. 9 is that FIG. 17 has an added plate 110 to delete the harmonic oscillations that are sometimes formed by surface 42.

Plate 110 has an arm 112 that encircles inlet cylinder 30, but is not attached to inlet cylinder 30, and is free to rotate around inlet cylinder 30. Ridge 116 is affixed to inlet cylinder 30 to hold plate 110 in a selected position relative to surface 42. Plate 110 is free to rotate around cylinder 30 and prevents the surface 42 from developing an undesirable harmonic oscillation. Plate 110 optionally may be provided with a curved rim 114 to direct the liquid from scrubbing cylinder rim 37 up as shown at 118 and to impact the liquid surface 42 as shown at 120.

The exact shape, size, and position of plate 110 depends on the size, shape, volume, and gas velocity of the scrubber. However, in some cases, it is not necessary for the plate to be rotatable and the plate even can be positioned a short distance below the liquid surface 42. The plate can be used on any of the scrubbers described herein as long as means is provided to affix the position of the plate in a selected position relative to rim 37.

Figure 10:
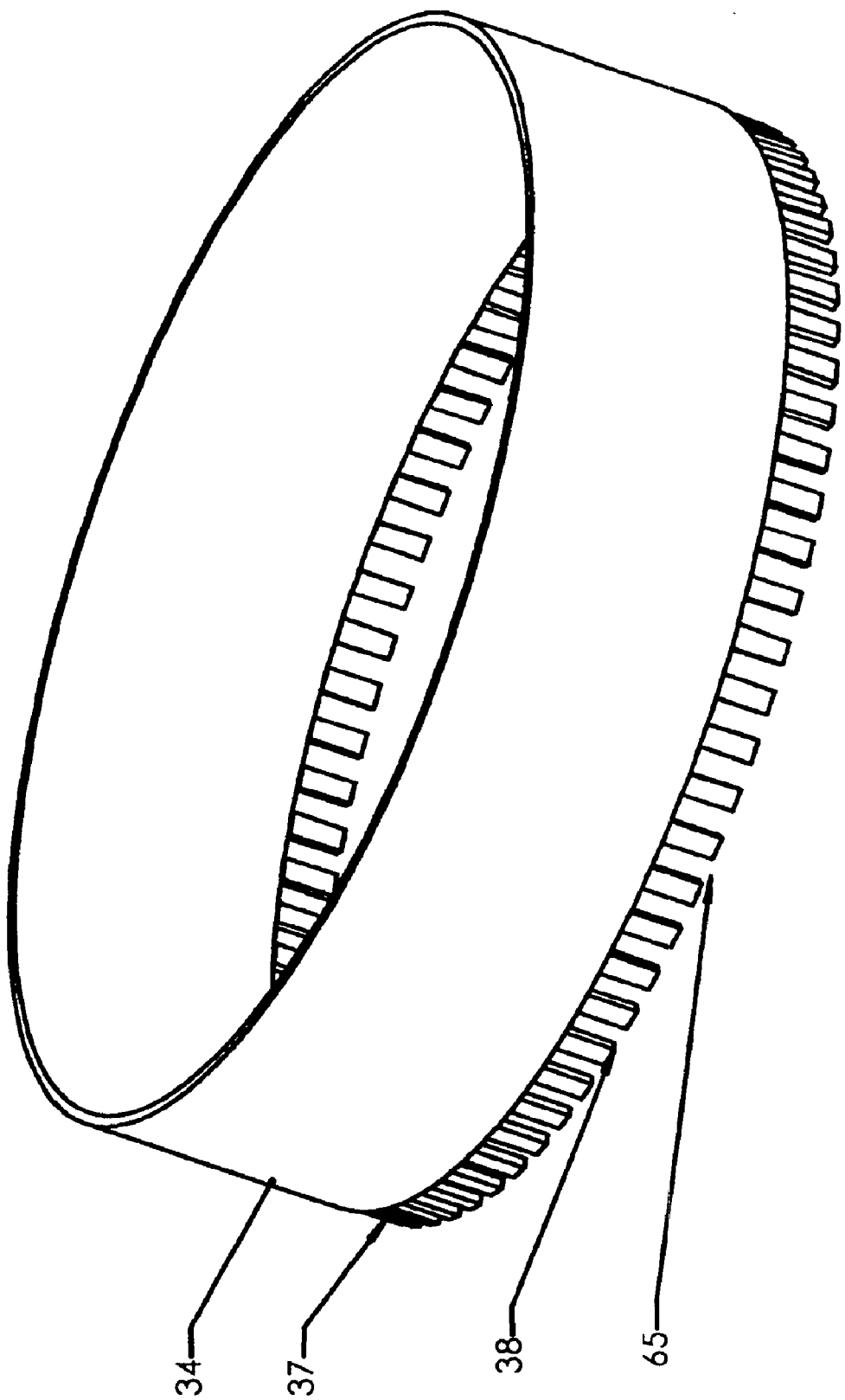
FIG. 10 is an isometric view schematically showing optional protrusions on the rim of the centrifugal cylinder used by the scrubber of the present invention.

FIG. 10 of the drawing is an isometric view of the lower portion of non-rotating scrubbing cylinder wall 34 of the scrubbers of the present invention. The gas and liquid mixes further as it flows around the rim 37 of scrubbing cylinder wall 34. Protrusions 38 are affixed to rim 37 and provide spaces 65 between the protrusions. The centrifugal force of the rotating stream of liquid flowing off rim 37 discharges the liquid through spaces 65 and forms many small individual streams of liquid flowing in a substantially horizontal, and tangential, direction off the rim. Some gas is mixed and scrubbed further with the liquid as it flows through spaces 65 with the liquid. In fact, spaces 65 may be large enough to allow substantially all of the gas to flow through the spaces with the liquid to scrub the gas. However, the remaining gas is scrubbed still further as it sweeps across liquid surface 42 and then flows up and through the spaces of the high velocity multiple streams of liquid flowing out of the spaces 65. These protrusions may optionally apply to all of the above scrubbers.

Figure 11:
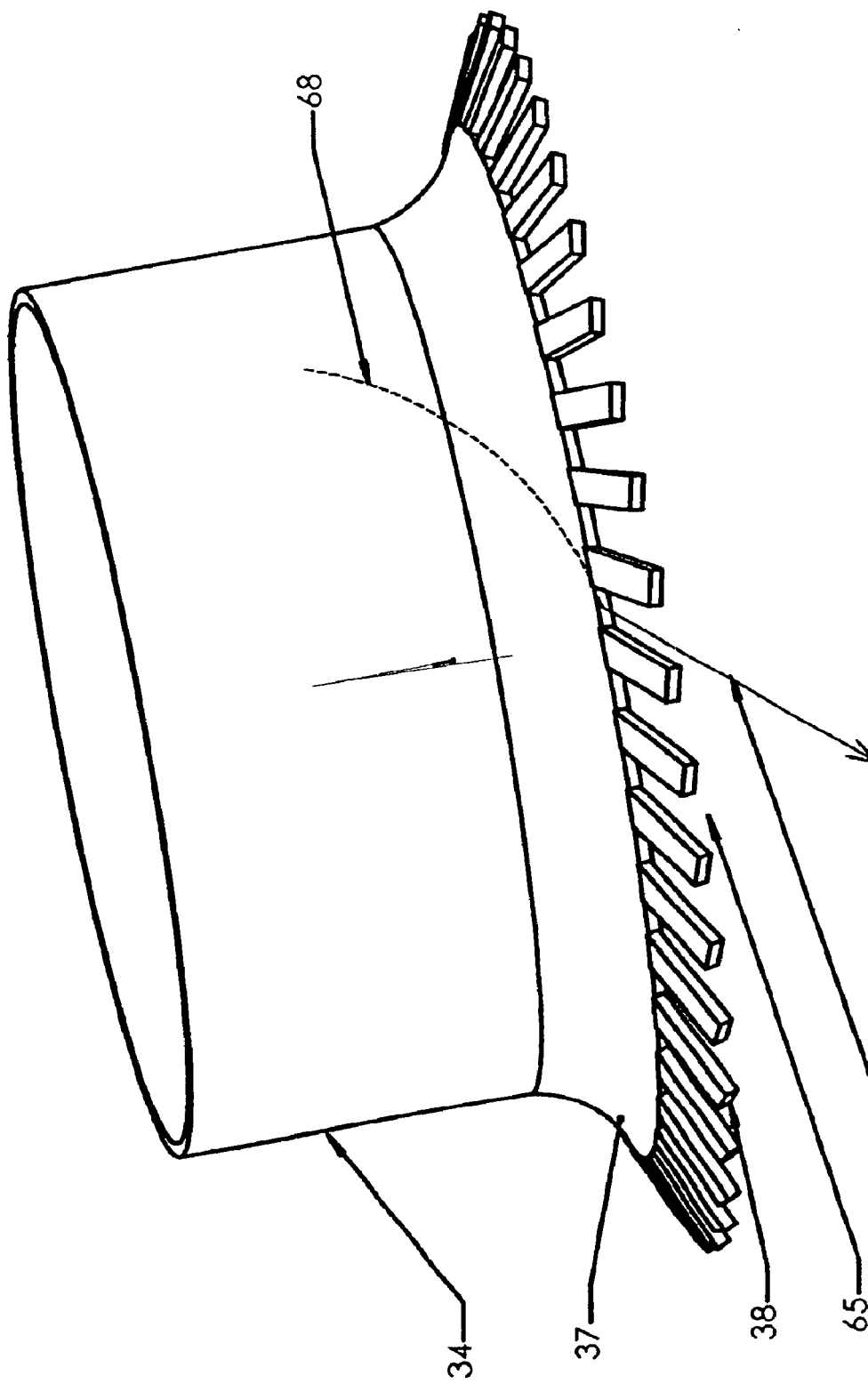
FIG. 11 is an isometric view schematically showing an optional form for the protrusions used on the rim of the centrifugal cylinder used by the scrubber of the present invention.

In some cases it may be desirable to further direct the flow of liquid off protrusions 38, to reduce the noise and better mix the gas and liquid, and FIG. 11 of the drawings shows one embodiment of a shape of rim 37 and protrusions 38 used to accomplish that. FIG. 11 shows the bottom portion of wall 34, of scrubbing cylinder 33 of the scrubbers of the present invention. Protrusions 38 are attached to rim 37 and provide spaces 65 there between. Rim 37 is Fared to form a bell shaped outlet and allows the liquid to flow around the bell as shown by arrow 68, by capillary action and the large volume of high velocity gas flowing down and out, and through spaces 65, as shown by arrow 48. Protrusions 38 are angled to the left of the viewer (for counter current rotation looking up) to allow the flowing liquid to enter spaces 65 with a minimum of friction loss and to minimize the retardation of the rotational rate. The protrusions allow some of the gas to flow through spaces 65 with the liquid, yet, the bell shaped rim and the downward directed protrusions direct the liquid out and in a downward direction. This downward direction causes the high velocity liquid stream, and the gas, to impact the liquid surface 42 (shown in FIG. 9) and further scrub the gas. When the liquid stream impacts the liquid surface 42 instead of cyclone wall 11, the operation of the scrubber is more efficient and quieter.

Any scrubbers of the present invention with the inlet from the bottom may optionally be provided with a second fan wheel to increase the flow through the scrubber and to increase the rate of rotation of the gas in cyclone space 60. This includes scrubbers 100, 200, 400, 500, and 600 of FIGS. 1, 2, 4, 5, and 6. Increasing the rotational rate of the gas in cyclone space 60 increases the centrifugal force on heavier particles in the gas and discharges a cleaner gas. Also, the gas outlet can be made smaller to increase the cyclone efficiency.

FIG. 12 schematically shows how a second fan wheel can optionally be added to the scrubbers with a bottom inlet. Also, the outlet opening 14 of scrubber 100 of FIG. 1 is substantially the same size as the diametric area of cyclone space 60, with no restrictions. This is a very economical means of construction and is preferred for some uses. However, some uses of the scrubbers with a bottom inlet require a restriction in outlet 14 of FIG. 12. An isometric view, with the front half removed, schematically shows one embodiment of such restriction. In FIG. 12, the top portion of cyclone wall 11, enclosing cyclone space 60 and having opening 14, is shown. The top portion of wall 11 is increased, as shown at 16, to provide for ledge 22 and increase the cyclone space to 61. If a second fan wheel is not used, it is not necessary to make the diameter of wall 16 greater than wall 11.

Top cover 26, with retaining ring 21 that fits over the top rim of wall 16, has a centrally positioned opening fitted to outlet cylinder 18. FIG. 12 also shows shaft 91 attaching to second fan wheel 80 positioned above the motor (see FIG. 1) having back plate 81, and blades 82 with flat sections 83 and curved sections 84. Outlet cylinder 18 has inlet opening 19 which, optionally, extends down into space 61, as shown, and outlet opening 20 positioned on the outside of the scrubber. This outlet restriction allows the heavier particulates to remain in space 61, since they are forced out centrifugally to the inside wall of wall 16, and allows the cleaner gas to discharge through the smaller middle opening 19.

Heavier particles and liquid vapor droplets coalesce on the inside of cyclone wall 16 and gravitate down to ledge 22. Ledge 22 is connected to conduit 23 to allow the collected materials to gravitate from ledge 22 to liquid reservoir 40, or out of the scrubber.

Figure 13:
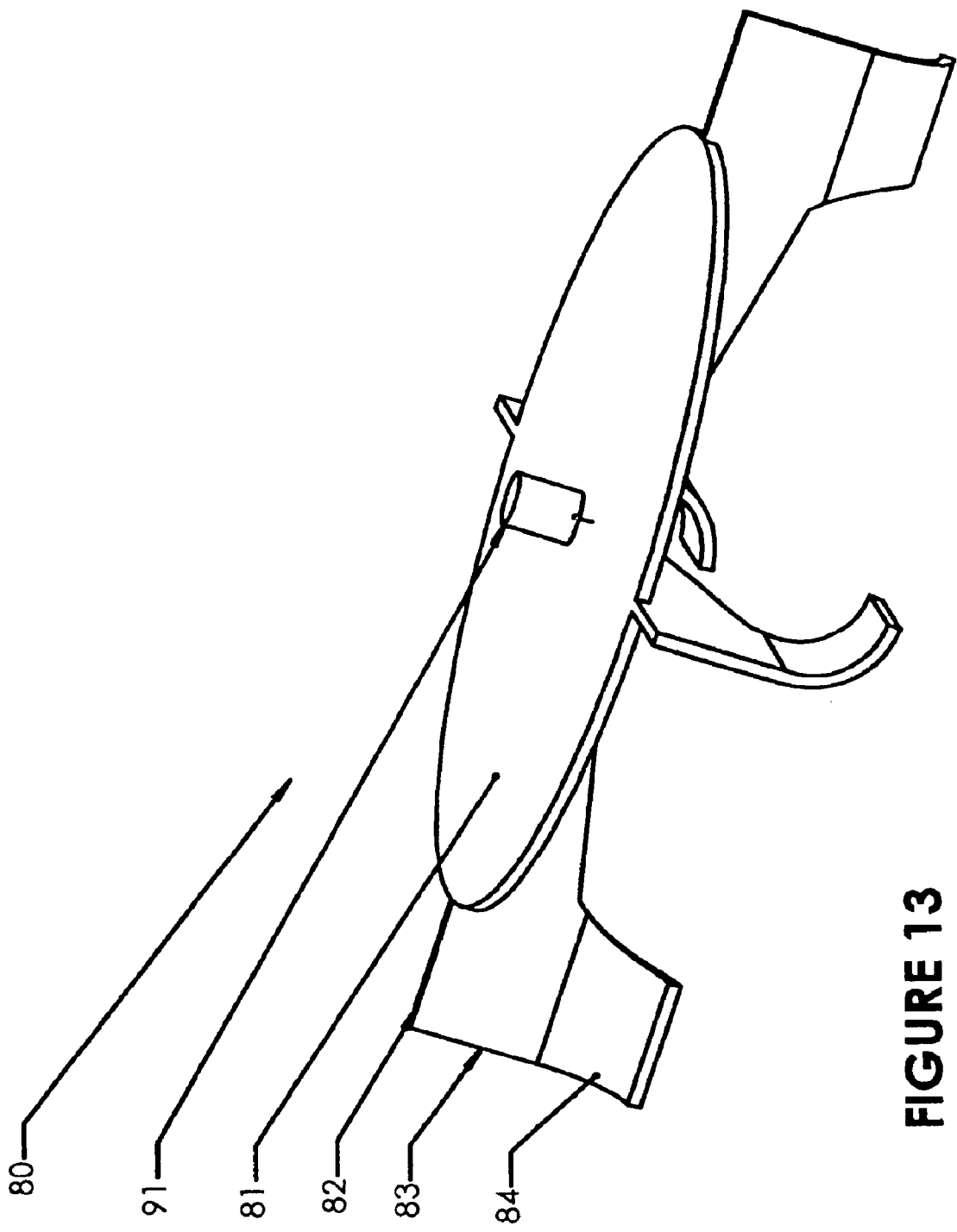
FIG. 13 is an isometric view schematically showing an optional form of the optional second fan wheel that can be used on the gas scrubber of FIGS. 1, 2, 4, 5, and 6 of the present invention.

FIG. 13 shows one embodiment of a shape that can be used on second fan wheel 80 of FIG. 12. In FIG. 13, fan wheel 80 is mounted for rotation on shaft 91 and has back-plate 81 with fan blades 82. The driving motor and remaining parts of the scrubbers are not shown in FIG. 13. In the embodiment shown, the blades 82 are of the radial type having a flat section 83, as shown, in order to increase the rate of rotation of the gas in cyclone space 60 and 61 of FIG. 12. However, the leading edge of blades 80 may be curved, as shown at 84, in order to better draw the gas through the scrubber.

Figure 16:
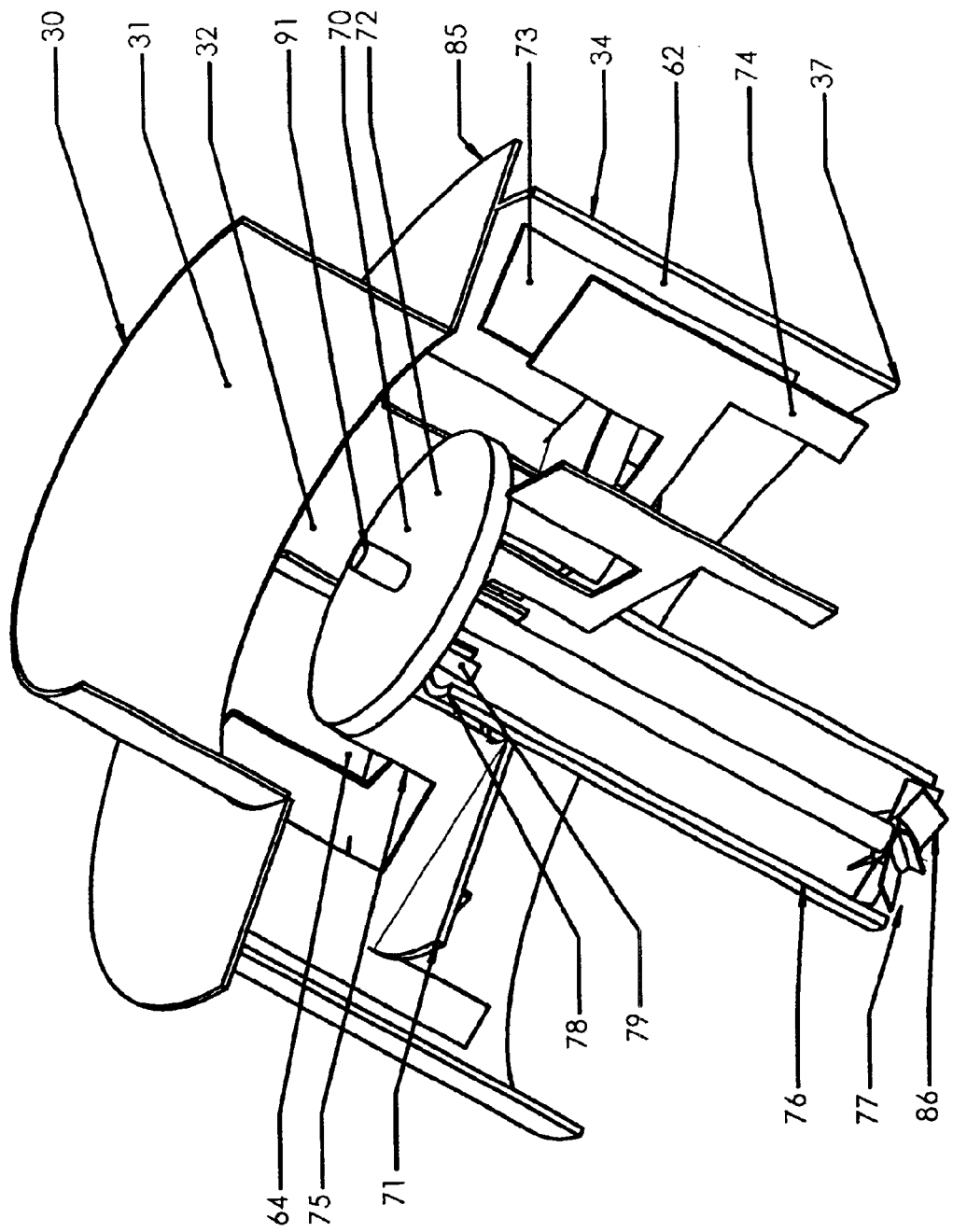
FIG. 16 is an isometric view schematically showing an enlargement of one proposed form of a fan wheel on the same shaft with liquid impellers used by the scrubber of FIG. 6 of the present invention.

FIG. 16 is an isometric enlargement of a portion of scrubbers 600 and 700 of FIGS. 6 and 7 to better illustrate the working parts of the fan wheel 70 and pump impeller 86. The front portion and some of the fan blades in FIG. 16 have been removed in order to show the inside parts more clearly. In FIG. 16, a portion of inlet cylinder 30, having inlet 31, outlet 32, connected to deflector wall 85 and scrubbing wall 34 having outlet rim 37, is shown.

Fan wheel 70 having base hub 72, outside blades 73 with blade extensions 74, mid blades 75, inside pump blades 79, and back plate 71 is also shown in FIG. 16. Scrubbing space 64, the space between mid blades 75 and outside blades 73, and scrubbing space 62, the space between the outside rims of blades 73 and the inside of wall 34, is more clearly illustrated in FIG. 16. The bottom portion of shaft 91 is shown attached to base hub 72 and pump impeller 86 that is positioned proximate the inlet 77 of non-rotating pump case 76. Case outlet 78 is positioned above fan back plate 71 and allows pumping blades 79 to extend down inside of pumping case 76.

The motor with supports, pump case support, and container 10 are not shown in FIG. 16. Refer to FIGS. 6 and 7 for these other parts and the full operation of the fan wheel in FIG. 16. However the partial operation of the fan wheel in FIG. 16 is as follows:

Shaft 91 is rotated by a motor (not shown) and rotates fan wheel 70 and pump impeller 86 attached thereto. Fan wheel 70 draws gas through inlet 31, cylinder 30, outlet 32, through fan space 64, and across fan blades 73. Impeller 86 draws liquid through inlet 77 and forces it up to outlet 78. Inside blades 79 circulate the liquid in case 76 and centrifugally force it at a high velocity off the rim of outlet 78. The mid blades 75 flattens the liquid and discharges it in thin layers at a high velocity through space 64 where it encounters and scrubs the incoming gas stream. Blades 73 accelerate and tangentially discharge the gas and liquid off of their outside rims through scrubbing space 62 and against the inside of wall 34 where the gas is centrifugally scrubbed further. Blade extensions 74 maintain the rotational rate of the gas and liquid in space 62 to maintain the centrifugal scrubbing.

The liquid to be used in these scrubbers depends on the physical composition and characteristics of the gas being processed. If the gas is a hydrocarbon and has a temperature greater than boiling water, then a light oil that has a boiling point greater than water should be used to remove the particulates. If water is used in a scrubber processing hydrocarbon gases before the particulates have been removed, a tight emulsion is usually formed when the water condenses.

If the gas being processed is air in a home, then the liquid can be water. A chlorine, propylene glycol, copper sulfate, or other chemical combinations may be added to the water to remove odors, carbon dioxide, and/or kill viruses and bacteria. Also, an ultra violet light may be added to the gas passage way to kill viruses and bacteria.

During testing of the present scrubber, it has been found that the temperature of the scrubbed gas may be several degrees cooler than the inlet unscrubbed gas. This is caused by the vaporization of the liquid. The temperature difference depends on the humidity and temperature of the inlet gas and the temperature of the liquid. Accordingly, the vaporization of the liquid can be decreased, thereby decreasing the humidity of the scrubbed air, by decreasing the temperature of the liquid. Also, the scrubber can be used to cool the gas by cooling the liquid.

If a dry scrubbed air is desired, the air can be cooled and the humidity of the air will be low. For industrial use, air is considered to be substantially dry at 40 degrees F. Accordingly, by cooling the liquid in the scrubber, the scrubber can be used as a dehumidifier and/or as an air cooler. To cool the liquid, a refrigerant coil 130, 133 (FIG. 1), with means 132, 134 to cool the coil, can be placed in the liquid reservoir 40. Alternatively, a stream of the liquid 151 can be circulated outside of the scrubber and over a refrigerant coil 150. In addition, the temperature of the scrubbed outlet air can be cross-exchanged with the unscrubbed inlet air to increase the efficiency of the scrubber.

Although the present invention and its advantages have been described in relation to the illustrated embodiments, it should be understood that various changes, substitutions and alterations can be made without departing from the spirit and scope of the invention as defined by the claims. The following are some examples of such substitutions:

Most of the fan blades can selectively be either forward curved, backward inclined, radial, radial tip, multiple rows, or combinations of other configurations, without departing from the scope of the present invention.

Liquid inlet pipe 50 and liquid outlet pipe 51 used on scrubber 100 of FIG. 1 can be used on any of the scrubbers.

The scrubber inlets and outlets of all of the scrubbers can be directed in different directions as taught by FIG. 8.

The motor of FIG. 8 can be located on top of the scrubber with the motor shaft passing through a seal in inlet pipe 30. In fact, the motors of all of the scrubbers can be selectively positioned outside of the scrubbers.

What is claimed is:

1. A gas scrubber for scrubbing a gas by using a liquid to remove particulate and absorb gas molecules from the gas, comprising:

a container having a reservoir for containing a liquid, the liquid having a surface that defines a space above the surface, the container also having a space outlet that connects the space to an exterior of the container;

a scrubbing cylinder positioned in the space and having a top, a fan wheel space positioned at the top, an inside wall, an open bottom end positioned above the surface of the liquid, and a centrifugal scrubbing space extending from the fan wheel space downward along the inside wall;

an inlet tube having an inlet positioned on the exterior of the container and an outlet positioned at the fan wheel space to provide a passage way that allows the gas to flow from the exterior of the container through the inlet tube, the fan wheel space, the centrifugal scrubbing space, over the surface of the liquid, through the space in the container, and out the space outlet;

a pump having an inlet connected to the reservoir and an outlet positioned to pump the liquid to the centrifugal scrubbing space to allow the liquid to circulate from the reservoir, through the pump, to the centrifugal scrubbing space, and back to the reservoir; and a fan wheel positioned in the fan wheel space and mounted to a shaft having a motor for rotating the shaft and the fan wheel, the fan wheel pumping the gas through the passage way and discharging the gas tangentially at a high velocity in the centrifugal scrubbing space, to rotate the liquid with the gas in the centrifugal scrubbing space, to impact and centrifugally mix the particulate and the gas molecules with the liquid to scrub the gas.

2. The scrubber of claim 1, wherein the shaft extends up into the space in the container, the shaft having a second fan wheel attached thereto to increase a rate of flow through the scrubber and to increase a rotational rate of gas in the space in the container.

3. The scrubber of claim 1, wherein the space outlet of the container has a top wall and an outlet opening that is centrally positioned in the top wall, the outlet opening having a diameter that is smaller than a diameter of the top wall.

4. The scrubber of claim 1, wherein the open bottom end of the scrubbing cylinder has an outlet rim that is flared and provided with slots to centrifugally direct the liquid flowing through the centrifugal scrubbing space to flow downward in a rotational manner and to impact the surface of the liquid.

5. The scrubber of claim 1, wherein the motor is mounted in the inlet tube.

6. The scrubber of claim 1, wherein the outlet of the pump has a filter.

7. The scrubber of claim 1, wherein the fan wheel has blades that have extensions that extend down into the centrifugal scrubbing space.

8. A gas scrubber for scrubbing a gas by using a liquid to remove particulate and absorb gas molecules from the gas, comprising:

a container having a reservoir for containing a liquid, the liquid having a surface that defines a space above the surface, the container also having a space outlet that connects the space to an exterior of the container;

a scrubbing cylinder positioned in the space and having a top, a fan wheel space positioned at the top, an inside wall, an open bottom end positioned above the surface of the liquid, and a centrifugal scrubbing space extending from the fan wheel space downward along the inside wall;

an inlet tube having an inlet positioned on the exterior of the container and an outlet positioned at the fan wheel space to provide a passage way that allows the gas to flow from the exterior of the container through the inlet tube, the fan wheel space, the centrifugal scrubbing space, over the surface of the liquid, through the space in the container, and out the space outlet;

a fan wheel positioned in the fan wheel space and mounted to a shaft having a motor for rotating the shaft and the fan wheel, the fan wheel pumping the gas through the passage way; and a pump having an inlet connected to the reservoir and an outlet positioned to pump the liquid to the fan wheel space to allow the liquid to circulate from the reservoir, through the pump, to the fan wheel, to the centrifugal scrubbing space, and back to the reservoir, and to allow the rotating fan wheel to discharge the gas and the liquid tangentially at a high velocity in the centrifugal scrubbing space, to rotate the liquid with the gas in the centrifugal scrubbing space, to impact and centrifugally mix the particulate and the gas molecules with the liquid to scrub the gas.

9. The scrubber of claim 8, wherein the pump comprises a cone-shaped case having a larger outlet end positioned at and attached to the fan wheel to rotate therewith and having a smaller inlet end positioned below the surface of the liquid to receive the liquid and centrifugally discharge the liquid out of the larger outlet end to the fan wheel.

10. The scrubber of claim 8, wherein the pump comprises a non-rotating pumping case having an inlet end positioned below the surface of the liquid, an outlet end positioned proximate the fan wheel, and an impeller attached to the shaft to rotate therewith, the shaft being positioned in the inlet end of the pumping case to pump the liquid through the outlet end to the fan wheel.

11. The scrubber of claim 8, wherein the shaft extends up into the space in the container, the shaft having a second fan wheel attached thereto to increase a rate of flow through the scrubber and to increase a rotational rate of gas in the space in the container.

12. The scrubber of claim 8, wherein the space outlet of the container has a top wall and an outlet opening that is centrally positioned in the top wall, the outlet opening having a diameter that is smaller than a diameter of the top wall.

13. The scrubber of claim 8, wherein the open bottom end of the scrubbing cylinder has an outlet rim that is flared and provided with slots to centrifugally direct the liquid flowing through the centrifugal scrubbing space to flow downward in a rotational manner and to impact the surface of the liquid.

14. The scrubber of claim 8, wherein the motor is mounted in the inlet tube.

15. The scrubber of claim 8, wherein the outlet of the pump has a filter.

16. The scrubber of claim 8, wherein the fan wheel has blades that have extensions that extend down into the centrifugal scrubbing space.

17. The scrubber of claim 8, wherein the fan wheel comprises a base hub having fan blades and protrusions that are vertically positioned to define a liquid receiving space between the protrusions and the shaft, an inlet scrubbing space located between the protrusions and the fan blades, and wherein the outlet of the pump is positioned in the liquid receiving space to allow the protrusions to discharge the liquid at a high velocity through the inlet scrubbing space to additionally scrub the gas.

18. A gas scrubber for scrubbing a gas by using a liquid to remove particulate and absorb gas molecules from the gas, comprising:
  a container having a top, a bottom wall, a side wall, a container outlet at the top, and a reservoir for containing a liquid, the liquid having a surface that defines a cyclone space between the surface, the side wall, and the container outlet;
  an inlet cylinder having an inlet attached to a centrally positioned opening in the bottom wall, the inlet cylinder being vertically mounted and extending up through the reservoir with an inlet cylinder outlet positioned above the surface;
  a scrubbing cylinder vertically mounted and centrally positioned in the cyclone space and encircling the container outlet, the scrubbing cylinder having a top, a closed end at the top that defines a fan wheel space between the inlet cylinder outlet and the closed end, and a bottom outlet positioned below the inlet cylinder outlet and above the surface of the liquid, and defining a scrubbing space between an interior of the scrubbing cylinder and an exterior of the inlet cylinder, to provide a passage way that allows the gas to flow from the exterior of the container through the inlet cylinder, the fan wheel space, the scrubbing space, out the bottom outlet, over the surface of the liquid, through the cyclone space, and out the container outlet;
  a pump having a pump inlet connected to the reservoir and a pump outlet connected to the scrubbing space, for circulating liquid from the reservoir, through the pump, the scrubbing space, and out the bottom outlet to the reservoir; and
  a fan wheel having fan blades and connected to a shaft having a motor to rotate the fan wheel, the fan wheel being positioned in the fan wheel space to pump the gas through the passage way, to discharge the gas tangentially at a high rotational rate in the scrubbing space, to rotate the liquid with the gas in the scrubbing space, and to impact and centrifugally mix the particulate and the gas molecules with the liquid to scrub the gas.

19. The scrubber of claim 18, wherein the shaft extends up into the cyclone space and has a second fan wheel attached thereto to increase a rate of flow through the scrubber and to increase the rotational rate of gas in the cyclone space.

20. The scrubber of claim 18, wherein the container outlet includes a top wall having a centrally positioned outlet opening that has a diameter that is smaller than a diameter of the top wall.

21. The scrubber of claim 18, wherein the bottom outlet of the scrubbing cylinder has an outlet rim that is flared and provided with slots to centrifugally direct the liquid flowing through the scrubbing space to flow downward in a rotational manner and to impact the surface of the liquid.

22. The scrubber of claim 18, wherein the pump outlet has a filter.

23. The scrubber of claim 18, wherein the fan blades of the fan wheel have extensions that extend down into the scrubbing space.

24. A gas scrubber for scrubbing a gas by using a liquid to remove particulate and absorb gas molecules from the gas, comprising:
  a container having a top, a container outlet located at the top, a bottom wall, and a side wall that define a reservoir for containing the liquid, the liquid having a surface that defines a cyclone space between the surface, the side wall, and the container outlet;
  a deflector wall mounted above the container outlet and having a vertically mounted, centrally positioned inlet cylinder with an inlet cylinder inlet positioned above the deflector wall and external to the container and an inlet cylinder outlet located below the inlet cylinder inlet;
  a scrubbing cylinder vertically mounted and having a scrubbing cylinder inlet encircling the inlet cylinder outlet and centrally attached to a bottom of the deflector wall, the scrubbing cylinder extending down centrally through the container outlet and into the cyclone space with a scrubbing cylinder outlet positioned above the surface, the scrubbing cylinder providing a fan wheel space at a top of the scrubbing cylinder inlet proximate the inlet cylinder outlet and forming a scrubbing space on an interior of the scrubbing cylinder that provides a passage way that allows a gas to flow from an exterior of the container through the inlet cylinder, the fan wheel space, the scrubbing space, out the scrubbing cylinder outlet, over the surface, through the cyclone space, and out the container outlet below the deflector wall;
  a pump having a pump inlet connected to the reservoir and a pump outlet positioned at the fan wheel space, to circulate the liquid from the reservoir through the pump and the fan wheel space, the scrubbing space, and out the scrubbing cylinder outlet back to the reservoir; and a fan wheel having fan blades and connected to a shaft having a motor to rotate the fan wheel, the fan wheel being positioned in the fan wheel space to pump the gas through the passage way and to discharge the gas and the liquid tangentially at a high rotational rate in the scrubbing space, to rotate the liquid with the gas, to impact and centrifugally mix the particulate and the gas molecules with the liquid to scrub the gas.

25. The scrubber of claim 24, wherein the pump comprises of a cone-shaped case having a larger outlet end positioned at and attached to the fan wheel to rotate therewith and a smaller inlet end positioned below the surface of the liquid to receive the liquid and centrifugally discharge the liquid out of the larger outlet end to the fan wheel.

26. The scrubber of claim 24, wherein the pump comprises of a non-rotating pumping case having an inlet end positioned below the surface of the liquid, an outlet end positioned proximate the fan wheel, and an impeller attached to the shaft to rotate therewith, the impeller being positioned in the inlet end of the case to pump the liquid through the outlet end to the fan wheel.

27. The scrubber of claim 24, wherein the scrubbing cylinder outlet has an outlet rim that is flared and provided with slots to centrifugally direct the liquid flowing through the scrubbing space to flow downward in a rotational manner and to impact the surface.

28. The scrubber of claim 24, wherein the pump outlet includes a filter.

29. The scrubber of claim 24, wherein the fan blades of the fan wheel have extensions that extend down into the scrubbing space.

30. The scrubber of claim 24, wherein the fan wheel includes a base hub having vertically positioned protrusions providing a liquid receiving space between the protrusions and the shaft and an inlet scrubbing space between the protrusions and the fan blades of the fan wheel, with the pump outlet positioned in the liquid receiving space to allow the protrusions to discharge the liquid at a high velocity through the scrubbing space to additionally scrub the gas.

31. A gas scrubber for scrubbing a gas by using a liquid to remove particulate and absorb gas molecules from the gas, comprising:

a container having a top, a container outlet at the top, a bottom wall, and a side wall providing a first reservoir for containing a liquid, the liquid having a surface forming a cyclone space between the surface, the side wall, and the container outlet;

an inlet cylinder vertically mounted in and extending up through the reservoir, the inlet cylinder having an inlet cylinder inlet centrally positioned in the bottom wall, and an inlet cylinder outlet positioned above the surface of the liquid;

a scrubbing cylinder vertically mounted and centrally positioned in the cyclone space and encircling the inlet cylinder outlet, the scrubbing cylinder having a top, a bottom, a closed end at the top forming a fan wheel space between the inlet cylinder outlet and the closed end, and a scrubbing cylinder outlet at the bottom positioned below the inlet cylinder outlet and above the surface of the liquid, and defining a scrubbing space between an interior of the scrubbing cylinder and an exterior of the inlet cylinder, to provide a passage way that allows a gas to flow from outside of the container through the inlet cylinder, the fan wheel space, the scrubbing space, out the scrubbing cylinder outlet, over the surface of the liquid, through the cyclone space, and out the container outlet;

a pump having a pump inlet connected to the first reservoir and a pump outlet connected to a second reservoir, the second reservoir being positioned in the inlet cylinder, and the pump pumping liquid from the first reservoir to the second reservoir and providing a second liquid surface in the second reservoir;

a fan wheel having fan blades and a vertically mounted, cone-shaped pumping case connected to a shaft and a motor to rotate the fan wheel, the fan wheel being positioned in the fan wheel space, the pumping case having a bottom smaller inlet end positioned below the second liquid surface to allow liquid to gravitate into the pumping case, and a top larger outlet end positioned at a mid-section of the fan blades; and the pumping case pumping liquid from the second reservoir to the fan blades to allow the liquid to flow from the first reservoir, through the pump, the second reservoir, the pumping case, the fan wheel, the scrubbing space, and back to the first reservoir, and the rotating fan blades pumping the gas through the passage way and discharging the gas and the liquid tangentially at a high rotational rate in the scrubbing space, to rotate the liquid with the gas in the scrubbing space, to impact and centrifugally mix the particulate and the gas molecules with the liquid to scrub the gas.

32. The scrubber of claim 31, wherein the shaft extends up into the cyclone space and has a second fan wheel attached thereto to increase a rate of flow through the scrubber and to increase a rotational rate of gas in the cyclone space.

33. The scrubber of claim 31, wherein the container outlet has a top wall with a centrally positioned outlet opening having a diameter that is smaller than a diameter of the top wall.

34. The scrubber of claim 31, wherein the scrubbing cylinder outlet has an outlet rim that is flared and provided with slots to centrifugally direct the liquid flowing through the scrubbing space to flow downward in a rotational manner and to impact the surface of the liquid.

35. The scrubber of claim 31, wherein the fan blades of the fan wheel have extensions that extend down into the scrubbing space.

36. A gas scrubber for scrubbing a gas by using a liquid to remove particulate and absorb gas molecules from the gas, comprising:

a container having a top, a container outlet at the top, a bottom wall, and a side wall providing a first reservoir for containing a liquid, the liquid having a first surface forming a cyclone space between the first surface, the side wall, and the container outlet;

an inlet cylinder vertically mounted and extending up through the reservoir, the inlet cylinder having a bottom, an inlet cylinder inlet at the bottom and attached to a centrally positioned opening in the bottom wall, a top, and an inlet cylinder outlet positioned at the top above the surface of the liquid;

a second reservoir positioned in the inlet cylinder and connected to the first reservoir to receive liquid from the first reservoir and form a second surface;

a scrubbing cylinder vertically mounted and centrally positioned in the cyclone space and encircling the inlet cylinder outlet, the scrubbing cylinder having a top, a closed end at the top that forms a fan wheel space between the inlet cylinder outlet and the closed end, a bottom, and a scrubbing cylinder outlet positioned below the inlet cylinder outlet and above the first surface, thereby defining a scrubbing space between an interior of the scrubbing cylinder and an exterior of the inlet cylinder, to provide a passage way that allows a gas to flow from outside of the container through the inlet cylinder, the fan wheel space, the scrubbing space, out the scrubbing cylinder outlet, over the first surface, through the cyclone space, and out the container outlet;

a fan wheel having fan blades and a vertically mounted, cone-shaped pumping case connected to a shaft and a motor to rotate the fan wheel, the fan wheel being positioned in the fan wheel space, and the pumping case having a bottom smaller inlet end positioned in the second reservoir below the second surface, to allow liquid to gravitate into the pumping case, and a top larger outlet end positioned at the fan blades; and the pumping case pumping liquid from the second reservoir to the fan blades to allow the liquid to flow from the first reservoir, through the pump, the second reservoir, the pumping case, the fan wheel, the scrubbing space, and back to the first reservoir, and the fan blades pumping the gas through the passage way and discharging the gas and the liquid tangentially at a high rotational rate in the scrubbing space, to rotate the liquid with the gas in the scrubbing space, to impact and centrifugally mix the particulate and the gas molecules with the liquid to scrub the gas.

37. The scrubber of claim 36, wherein the shaft extends up into the cyclone space and has a second fan wheel attached thereto to increase a rate of flow through the scrubber and to increase a rotational rate of gas in the cyclone space.

38. The scrubber of claim 36, wherein the container outlet has a top wall with a centrally positioned outlet having a diameter that is smaller than a diameter of the top wall.

39. The scrubber of claim 36, wherein the scrubbing cylinder outlet has an outlet rim that is flared and provided with slots to centrifugally direct the liquid flowing through the scrubbing space to flow downward in a rotational manner and to impact the first surface.

40. The scrubber of claim 36, wherein the fan blades of the fan wheel have extensions that extend down the scrubbing space.

41. A gas scrubber for scrubbing a gas by using a liquid to remove particulate and absorb gas molecules from the gas, comprising:

a container having a top, a container outlet at the top, a bottom wall, and a side wall providing a reservoir for containing a liquid, the liquid having a first surface forming a cyclone space between the surface, the side wall, and the container outlet;

an inlet cylinder vertically mounted and extending up through the reservoir, the inlet cylinder having a bottom, an inlet cylinder inlet at the bottom and attached to a centrally positioned opening in the bottom wall, a top, and an inlet cylinder outlet at the top positioned above the first surface;

a non-rotatable pumping case positioned in the inlet cylinder and having a pumping case inlet connected to the reservoir to receive liquid from the reservoir;

a scrubbing cylinder vertically mounted and centrally positioned in the cyclone space and encircling the inlet cylinder outlet, the scrubbing cylinder having a top, a closed end at the top that defines a fan wheel space between the inlet cylinder outlet and the closed end, a bottom, and a scrubbing cylinder outlet positioned below the inlet cylinder outlet and above the first surface, thereby defining a scrubbing space between an interior of the scrubbing cylinder and an exterior of the inlet cylinder, to provide a passage way that allows a gas to flow from outside of the container through the inlet cylinder, the fan wheel space, the scrubbing space, out the scrubbing cylinder outlet, over the first surface, through the cyclone space, and out the container outlet;

a fan wheel having fan blades connected to a shaft and a motor to rotate the fan wheel, the fan wheel being positioned in the fan wheel space;

a pump impeller positioned proximate the pumping case inlet and connected to the shaft to rotate therewith and pump liquid up and out of a pump case outlet that is positioned at the fan blades to allow liquid to circulate from the reservoir, through the pumping case, the fan wheel space, the scrubbing space, and back to the reservoir; and the rotating fan wheel receiving the liquid from the pump case outlet and pumping the gas through the passage way and discharging the gas and the liquid tangentially at a high rotational rate in the scrubbing space, to rotate the liquid with the gas in the scrubbing space, to impact and centrifugally mix the particulate and the gas molecules with the liquid to scrub the gas.

42. The scrubber or claim 41, wherein the shaft extends up into the cyclone space and has a second fan wheel attached thereto to increase a rate of flow through the scrubber and to increase a rotational rate of gas in the cyclone space.

43. The scrubber of claim 41, wherein the container outlet has a top wall with a centrally positioned outlet opening a diameter that is smaller than a diameter of the top wall.

44. The scrubber of claim 41, wherein the scrubbing cylinder outlet has an outlet rim that is flared and provided with slots to centrifugally direct the liquid flowing through the scrubbing space to flow downward in a rotational manner and to impact the first surface.

45. The scrubber of claim 41, wherein the motor is mounted in the inlet cylinder.

46. The scrubber of claim 41, wherein the fan blades of the fan wheel have extensions that extend down into the scrubbing space.

47. A gas scrubber for scrubbing a gas by using a liquid to remove particulate and absorb gas molecules from the gas, comprising:

a container having a top, a container outlet at the top, a bottom wall, and a side wall providing a reservoir for containing a liquid, the liquid having a surface forming a cyclone space between the surface, the side wall, and the container outlet;

a deflector wall mounted above the container outlet and having a vertically mounted inlet cylinder with a top, a bottom, an inlet cylinder inlet at the top, an inlet cylinder outlet at the bottom, a centrally positioned inlet opening attached to the inlet cylinder outlet, and the inlet cylinder inlet being positioned above the deflector wall and external to the container;

a scrubbing cylinder vertically mounted and extending down centrally through the container outlet into the cyclone space, the scrubbing cylinder having a top, a scrubbing cylinder inlet at the top, encircling the inlet cylinder outlet, and centrally attached to a bottom of the deflector wall, a scrubbing cylinder outlet positioned above the surface of the liquid, a fan wheel space at the top of the scrubbing cylinder inlet end proximate the inlet cylinder outlet and forming a scrubbing space on an interior of the scrubbing cylinder that provides a passage way that allows a gas to flow from outside of the container through the inlet cylinder, the fan wheel space, the scrubbing space, out the scrubbing cylinder outlet, over the surface of the liquid, through the cyclone space, and out the container outlet below the deflector wall;

a pumping case having a pump inlet positioned below the surface of the liquid, a pump outlet positioned at the fan wheel space, an impeller positioned in the pump inlet and attached to a shaft and a motor to rotate the shaft, to circulate liquid from the reservoir, through the fan wheel space, through the scrubbing space, and back to the reservoir; and a fan wheel having fan blades, connected to the shaft and positioned in the fan wheel space to receive the liquid and pump the gas through the passage way and to discharge the gas and the liquid tangentially at a high rotational rate in the scrubbing space, to rotate the liquid with the gas, to impact and centrifugally mix the particulate and the gas molecules with the liquid to scrub the gas.

48. The scrubber of claim 47, wherein the shaft extends up into the cyclone space and has a second fan wheel attached thereto to increase a rate of flow through the scrubber and to increase a rotational rate of gas in the cyclone space.

49. The scrubber of claim 47, wherein the scrubbing cylinder outlet has an outlet rim that is flared and provided with slots to centrifugally direct the liquid flowing through the scrubbing space to flow downward in a rotational manner and to impact the surface of the liquid.

50. The scrubber of claim 47, wherein the motor is mounted in the inlet cylinder.

51. The scrubber of claim 47, wherein the motor is mounted below the bottom wall of the container and the shaft extends up from the motor through a seal in the bottom wall.

52. The scrubber of claim 47, wherein the fan blades of the fan wheel have extensions that extend down into the scrubbing space.

53. The scrubber of claim 1, further comprising a plate positioned below the open bottom end of the scrubbing cylinder to prevent the surface of the liquid from developing an undesirable harmonic oscillation.

54. The scrubber of claim 1, further comprising a refrigerant coil and means to cool the refrigerant coil, positioned in the reservoir of the container.

55. The scrubber of claim 1, further comprising means for circulating a stream of the liquid from the reservoir over a cooled coil and back to the reservoir.

* * * * *